US012713000B1

(12) United States Patent
Hu et al.

(10) Patent No.: US 12,713,000 B1
(45) Date of Patent: Aug. 18, 2026

(54) 2D-3D SWITCHABLE ELECTRONIC DEVICE WITH AN OPTIMIZED 2D MODE

(71) Applicant: JoyVision Technology., CO LTD, Taoyuan City (TW)

(72) Inventors: Cheng-Chung Hu, Taoyuan City (TW); Hsiu-Hung Lin, New Taipei City (TW)

(73) Assignee: JOYVISION TECHNOLOGY., CO LTD, Taoyuan City (TW)

( * ) Notice: Subject to any disclaimer, the term of this patent is extended or adjusted under 35 U.S.C. 154(b) by 0 days.

(21) Appl. No.: 19/214,113

(22) Filed: May 21, 2025

(30) Foreign Application Priority Data

Feb. 14, 2025 (TW) ................................ 114105615

(51) Int. Cl.
*H04N 13/359* (2018.01)
*H04N 13/305* (2018.01)
*H04N 13/398* (2018.01)

(52) U.S. Cl.
CPC ......... *H04N 13/359* (2018.05); *H04N 13/305* (2018.05); *H04N 13/398* (2018.05)

(58) Field of Classification Search
CPC .... H04N 13/305; H04N 13/398; H04N 13/31; H04N 13/128; H04N 13/351; H04N 13/383; G02B 30/27; G02B 30/30; G02B 2027/0134; G02B 30/28; G02B 13/0015
See application file for complete search history.

(56) References Cited

U.S. PATENT DOCUMENTS 11,955,038 B1 * 4/2024 Zhang .................... G02B 30/29

* cited by examiner

*Primary Examiner* — Farhan Mahmud
(74) *Attorney, Agent, or Firm* — McClure, Qualey & Rodack, LLP

(57) ABSTRACT

A method and electronic device for optimizing 2D image display in autostereoscopic systems without removing the parallax unit. The system includes an image panel, a parallax unit positioned in front of it, and control circuitry. In 3D mode, the system displays directional images for left and right eye separation. In 2D mode, it improves image quality by classifying pixels beneath the parallax unit into multiple groups and applying diagonal jitter in a direction perpendicular to the lens extension.

6 Claims, 23 Drawing Sheets

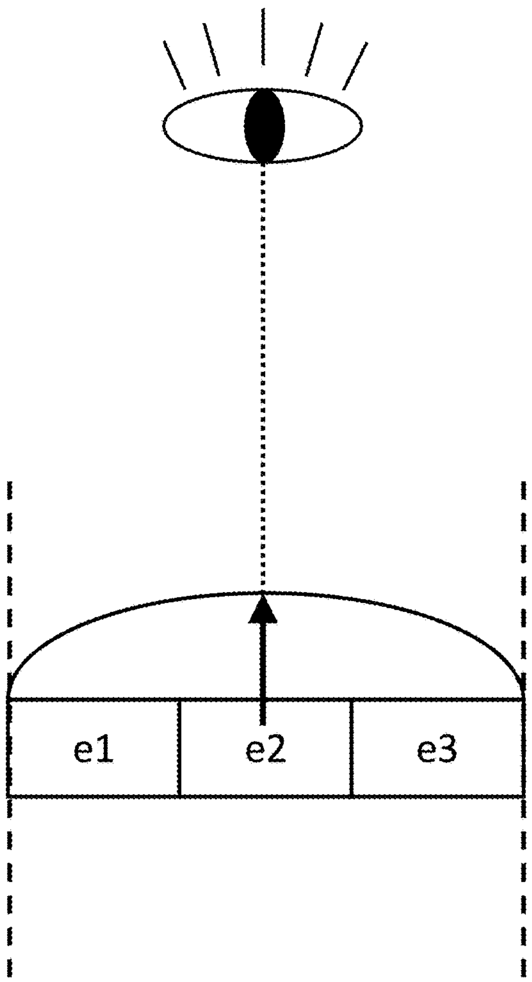
FIG. 5A
FIG. 5B
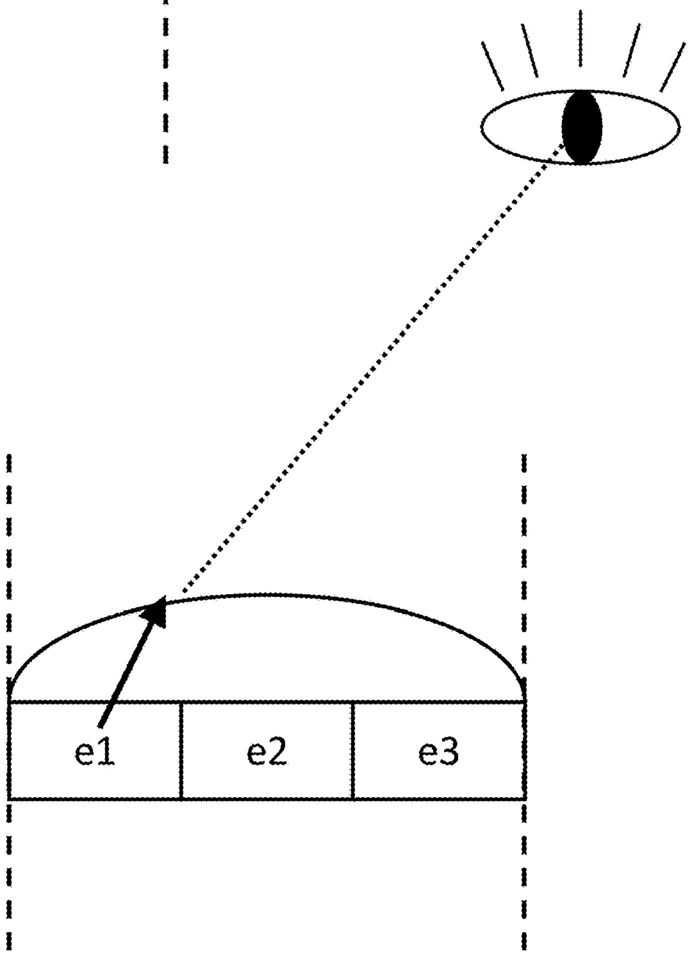

FIG. 7A
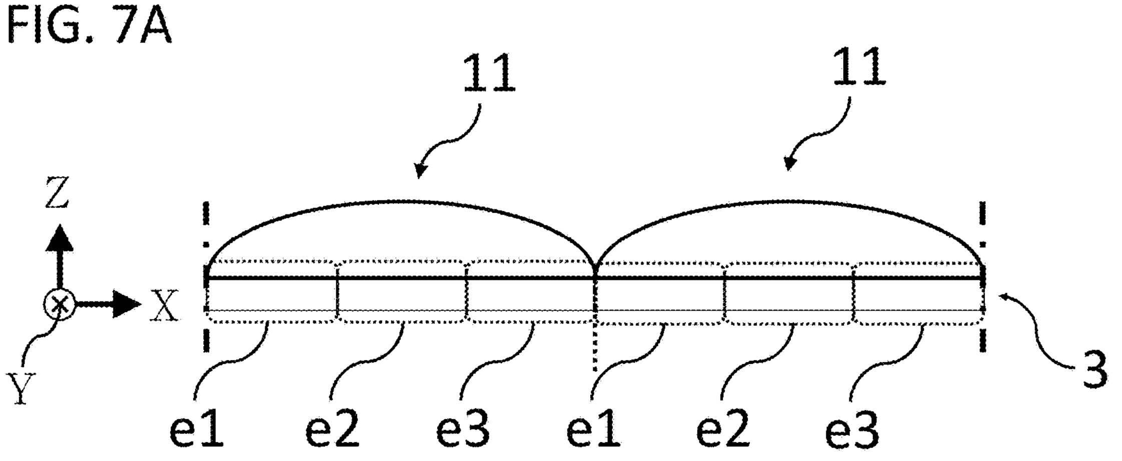
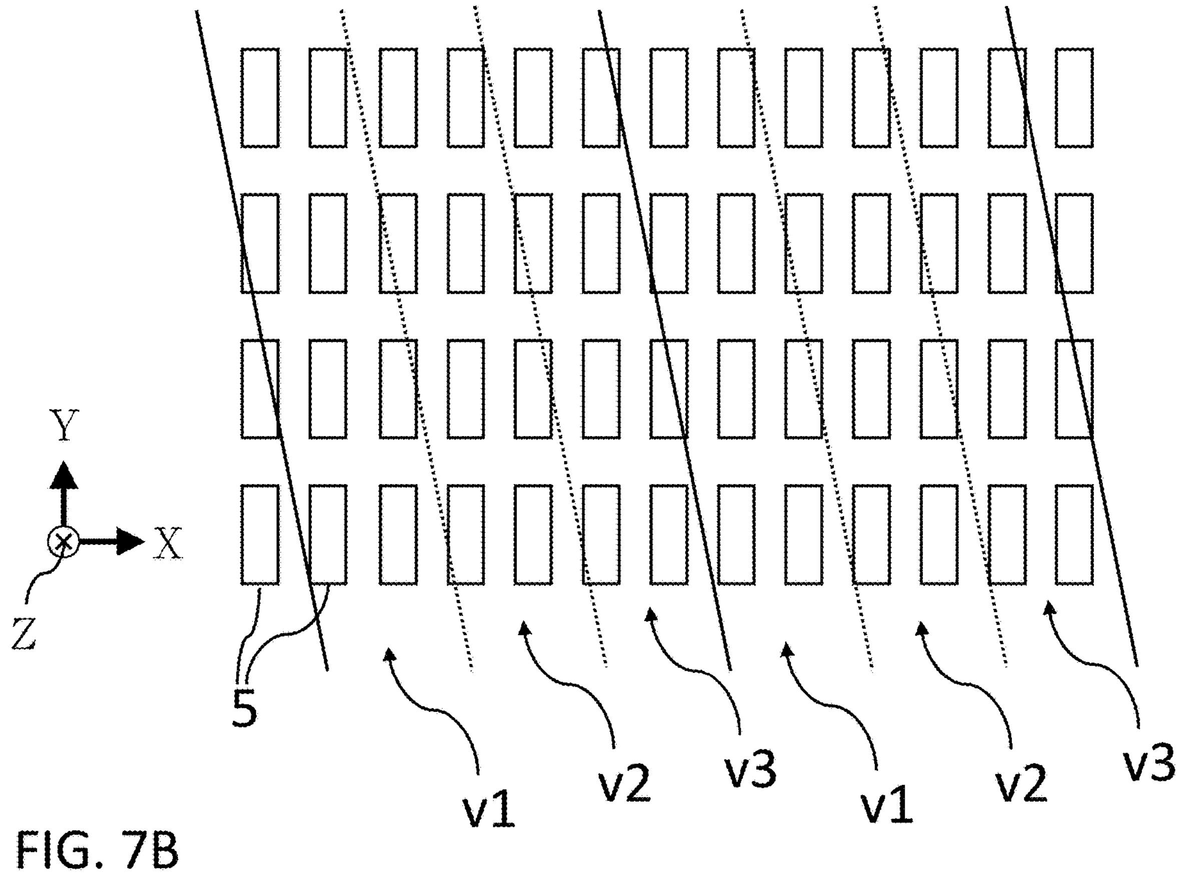
FIG. 7B

200 e1 e2 e3 e4 e5 e6 e7 e8 e9

100 e1 e2 e3 e4 e5 e6 e7 e8 e9 e1 e2 e3 e4 e5 e6 e7 e8 e9 e1 e2 e3 e4 e5 e6 e7 e8 e9

200
100
e1 e2 e3 e4 e5 e6 e7 e8 e9
G1 G2 G3
S
EX
e1 e2 e3 e4 e5 e6 e7 e8 e9
G1 G2 G3
S
EX
e1 e2 e3 e4 e5 e6 e7 e8 e9
G1 G2 G3
S
EX
e1 e2 e3 e4 e5 e6 e7 e8 e9
G1 G2 G3

2D-3D SWITCHABLE ELECTRONIC DEVICE WITH AN OPTIMIZED 2D MODE

CROSS-REFERENCE TO RELATED APPLICATIONS

This non-provisional application claims priority under 35 U.S.C. § 119(a) on Patent Application No(s). 114105615 filed in Taiwan, Republic of China on Feb. 14, 2025, the entire contents of which are hereby incorporated by reference.

PRIOR ART

Autostereoscopic devices create a 3D viewing experience by presenting different images to the left and right eyes, which the brain fuses using parallax cues to perceive depth. These devices typically include a pixel-based image panel and a parallax unit placed in front of it, and support both 3D and 2D viewing modes. The technique of including the parallax unit is well established and described in U.S. patent application Ser. No. 18/540,602. In 3D mode, separate image sets are shown to each eye. In 2D mode, however, only one image set is used, but due to the presence of the fixed parallax unit, image quality can degrade at certain angles.

BACKGROUND OF THE INVENTION

The present invention relates to an autostereoscopic device and an optimized display method in 2D mode when used in conjunction with a lens array.

SUMMARY OF THE INVENTION

The present invention relates to an electronic display system configured to improve two-dimensional image quality in an autostereoscopic environment without requiring removal of the parallax unit, such as a lenticular lens array. In particular, the invention provides an electronic device comprising a pixel array covered by lenticular lens units and control circuitry capable of operating in both stereoscopic and monoscopic modes.

In stereoscopic mode, the control circuitry renders and simultaneously presents directional three-dimensional images to respective viewing zones. In monoscopic (two-dimensional) mode, the invention enhances visual clarity by employing an image segmentation process and a technique referred to as "diagonal jitter," in which image segments are alternately reassigned to different viewing zones across multiple time intervals. This jittering occurs in a direction substantially perpendicular to the extension of the lens elements and helps to reduce parallax artifacts, ghosting, and directional aliasing.

Additionally, in some embodiments, multiple sets of image segments are sequentially or repeatedly presented to all viewing zones, and their combinations may be weighted differently in presentation frequency to improve temporal fusion. The boundaries of the image segments may be slanted with respect to the display's pixel rows and columns, optimizing pixel coverage and visual blending across views.

Accordingly, the invention offers improved image uniformity and stable two-dimensional viewing in lenticular-based autostereoscopic displays, while preserving support for stereoscopic 3D content. These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIGS. 5A-5C illustrate how, when rapidly switching pixel contents, the brain fuses them into a single 2D image.

FIGS. 7A-7E illustrate an embodiment in which the rendered content includes image segments that are dynamically assigned to different viewing zones at different time periods.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the present invention. However, it will be apparent to one of ordinary skill in the art that the present invention may be practiced without these specific details. In other instances, well-known methods, components, have not been described in detail so as not to unnecessarily obscure aspects of the embodiments.

Figure 1A:
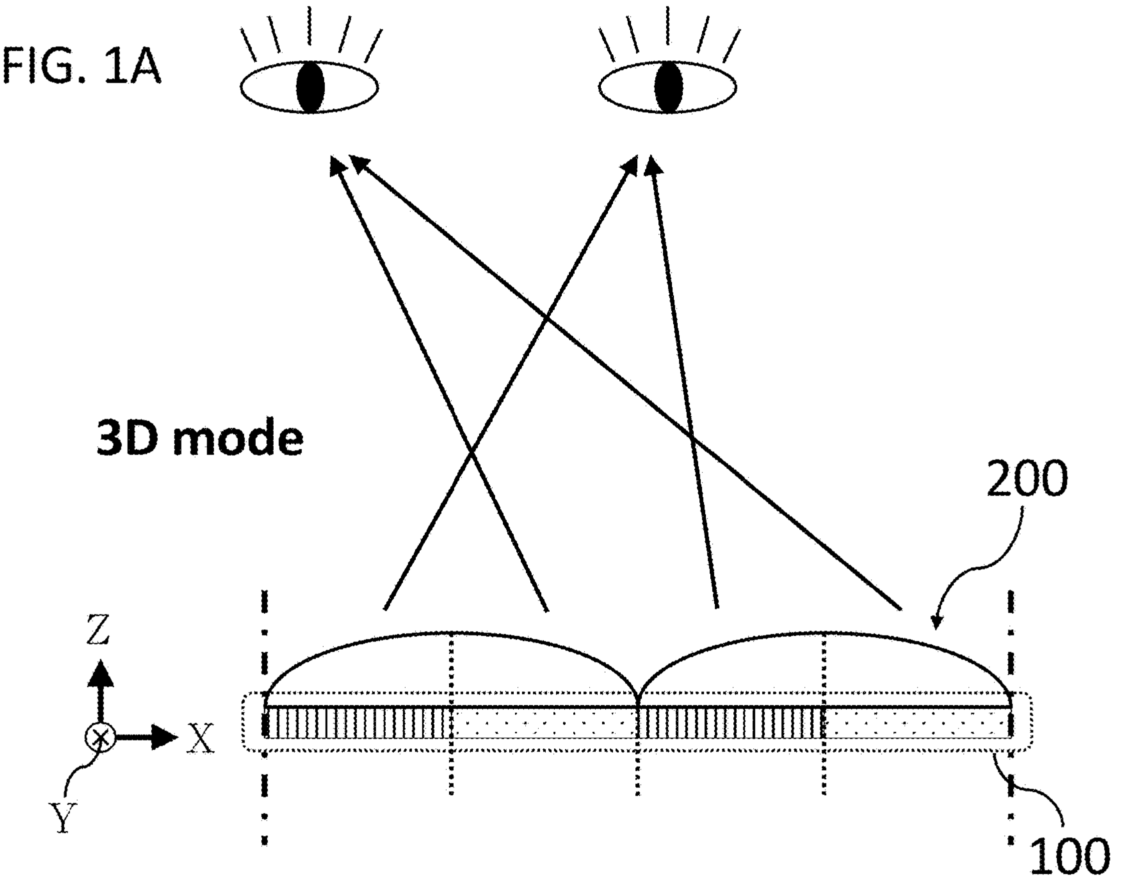
FIGS. 1A-1B illustrate a conventional autostereoscopic display in 3D mode.
Figure 1B:
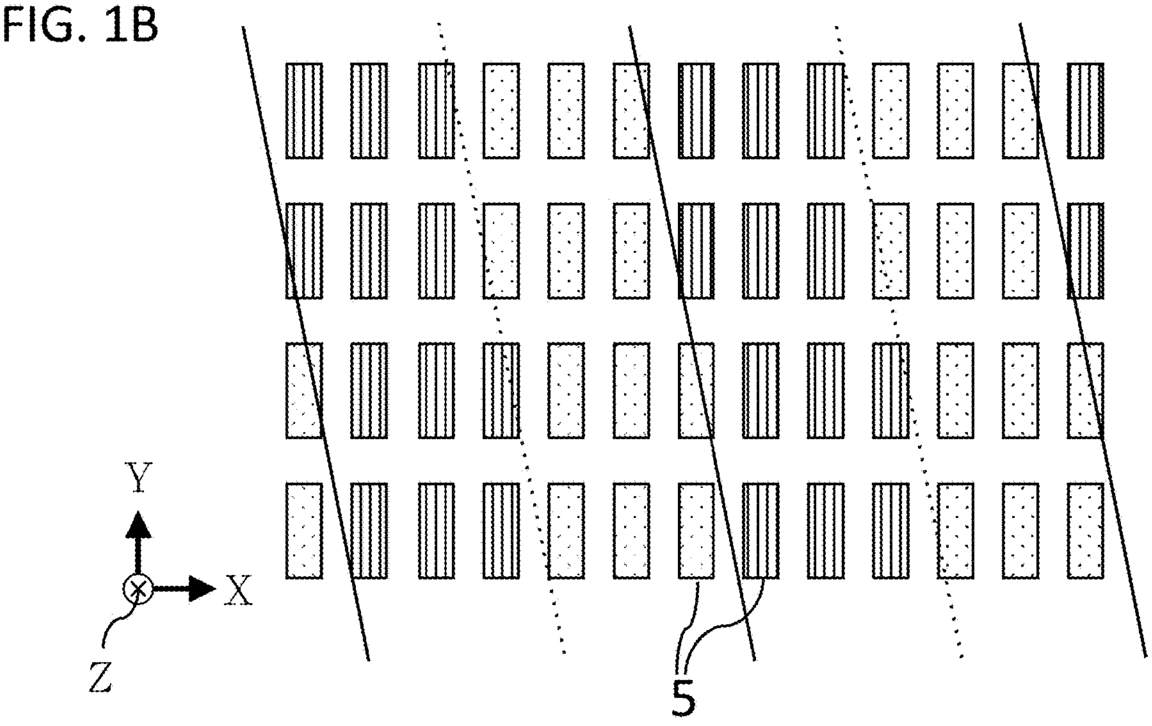

As shown in FIG. 1A, a conventional stereoscopic image display device may include: an image panel 100, comprising a plurality of pixels 5 arranged in multiple rows and columns as shown in FIG. 1B, a top view of a portion of the image panel 100; and a parallax unit 200, disposed in front of the image panel 100. Please note that FIG. 1A is a conceptual illustration intended to show that the left and right eyes perceive content generated by different groups of pixels (represented by different patterns for illustrative purposes). In practice, the actual product's cross-sectional view does not expose the pixels 5, nor does it contain the patterned representation shown in the figure. Moreover, the pixels 5 within each group may individually display different colors. Such stereoscopic image display devices typically allow users to switch between a 3D (three-dimensional/stereoscopic) mode and a 2D (two-dimensional/monoscopic) mode. Prior arts can be found in Classification H04N13/356—Image reproducers having separate monoscopic and stereoscopic modes.

Figure 2A:
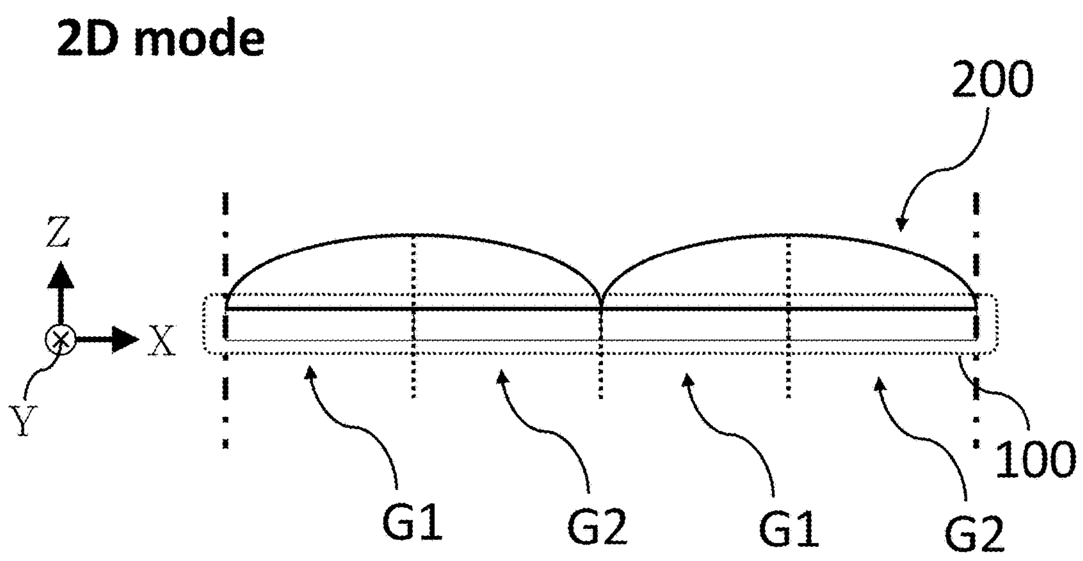
FIGS. 2A-2C illustrate the conventional autostereoscopic display in 2D mode.
Figure 2B:
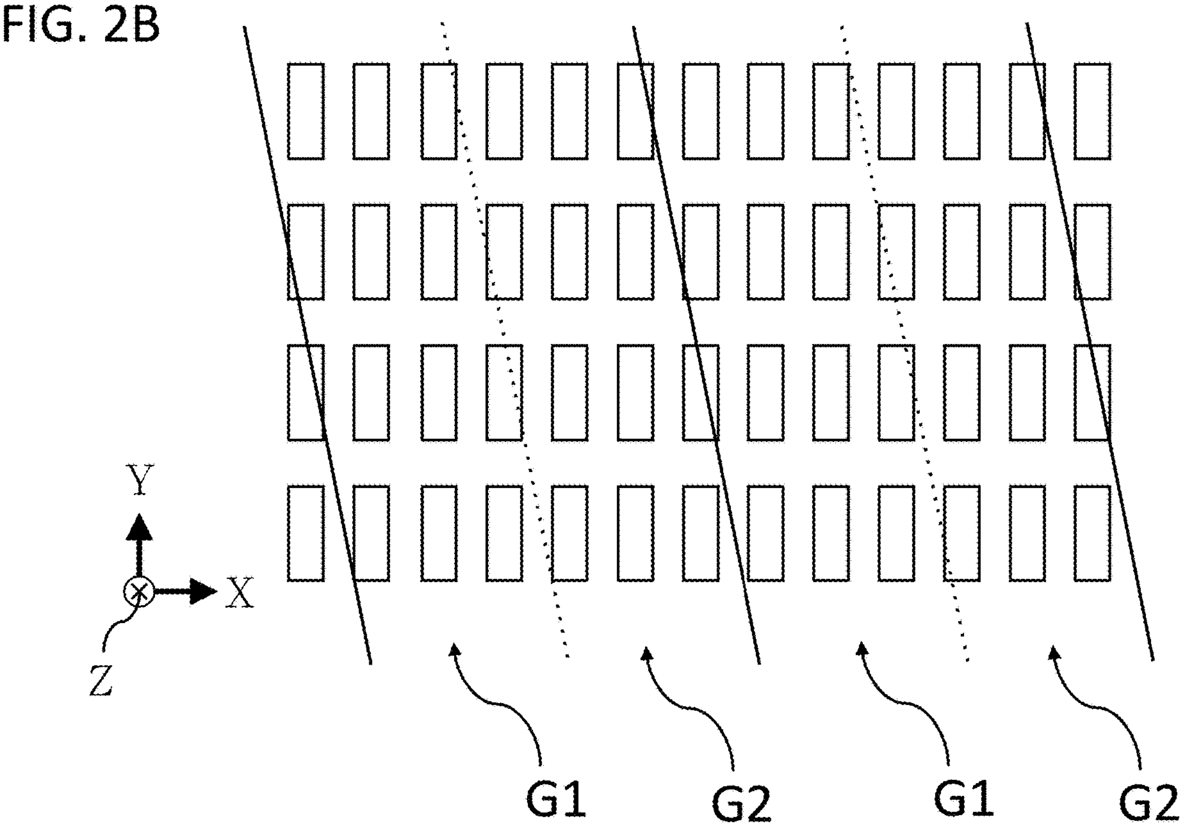

When the user selects the 3D mode, the display device presents different images in different directions, enabling the viewer's left and right eyes to respectively see different images. When the user selects the 2D mode, the display device uses only a single set of images. However, since the parallax unit 200 positioned in front of the image panel 100 cannot be arbitrarily removed, the displayed image is still split by the parallax unit 200, resulting in suboptimal image quality from many viewing angles. As shown in FIGS. 2A and 2B, in 2D mode the viewer's left eye may perceive an optimized image corresponding to pixel group G1, while the right eye may perceive an optimized image corresponding to pixel group G2. It is important to emphasize that pixel group G1 and pixel group G2, in the 2D mode, are differentiated based on their relative positions beneath the parallax unit 200 (e.g., the left side corresponds to pixel group G1, and the right side to pixel group G2), and are not two specially crafted image sets intended for stereoscopic viewing.

Figure 2C:
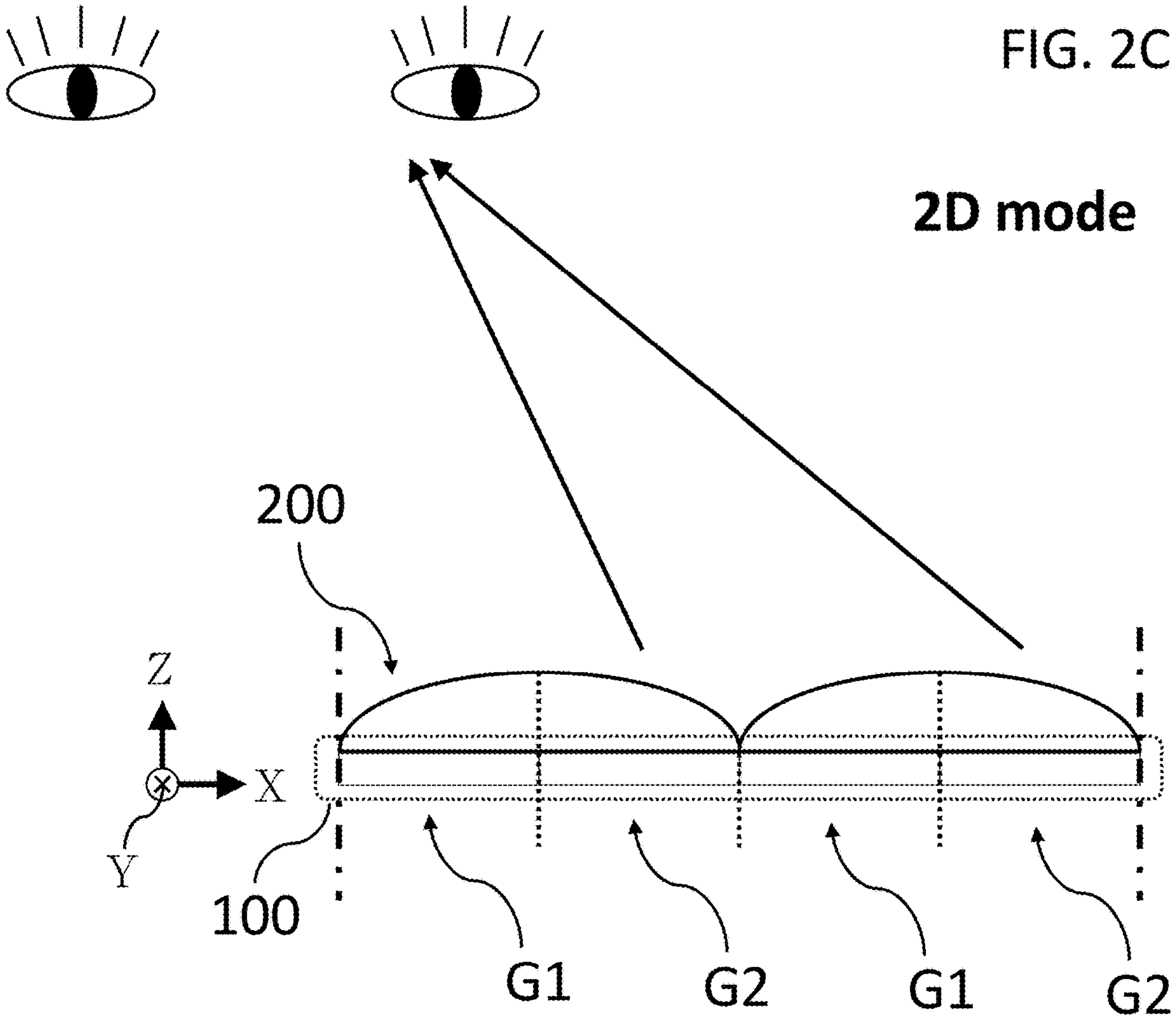

Therefore, from many viewing angles, the user must slightly shift their position horizontally (as shown in FIG. 2C) for the left eye to more clearly view pixel group 2. Since the parallax unit 200 (e.g., a 3D film adhered to a smartphone screen) cannot be easily or quickly removed, the image perceived by the user in 2D mode may appear degraded.

Figure 3A:
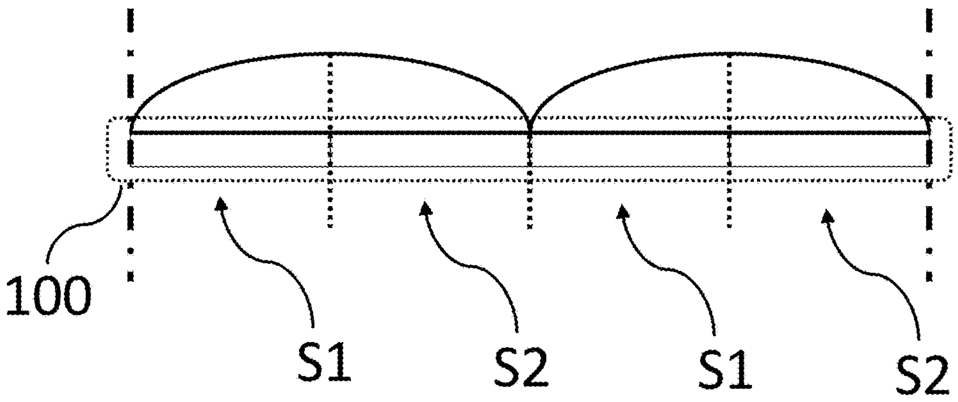
FIGS. 3A-3D illustrate an embodiment of the electronic device that enhances visual performance in 2D mode.
Figure 3B:
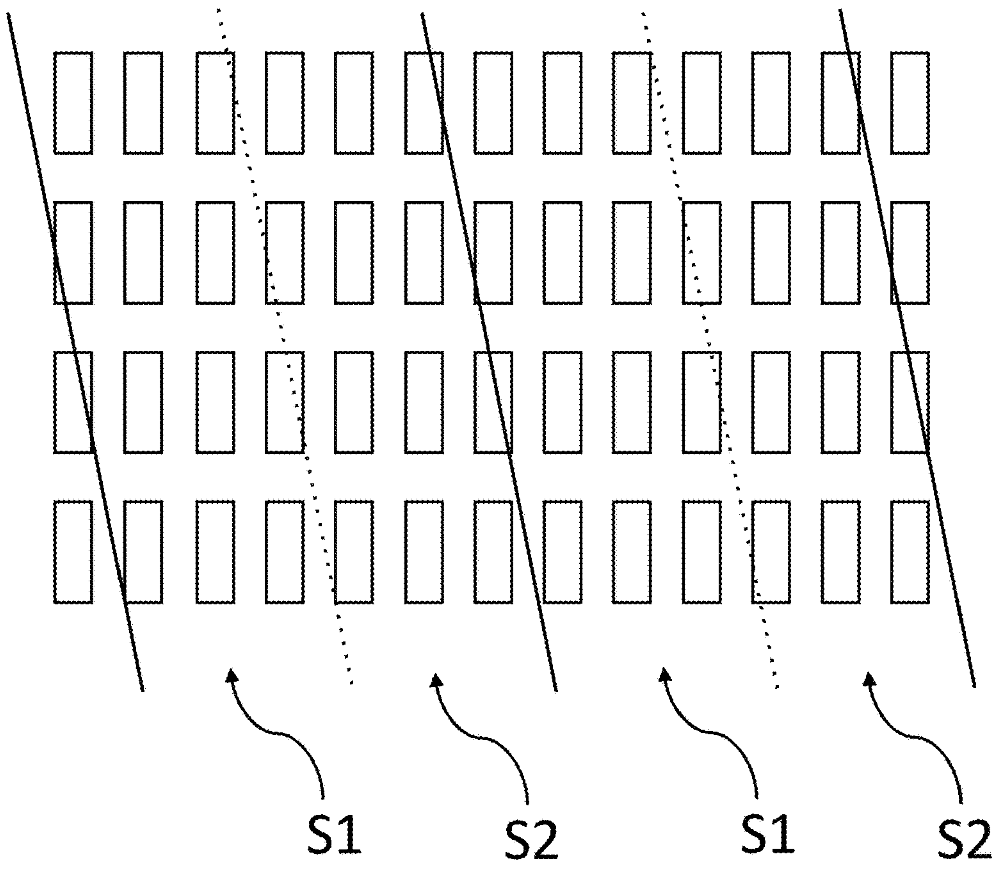
Figure 3C:
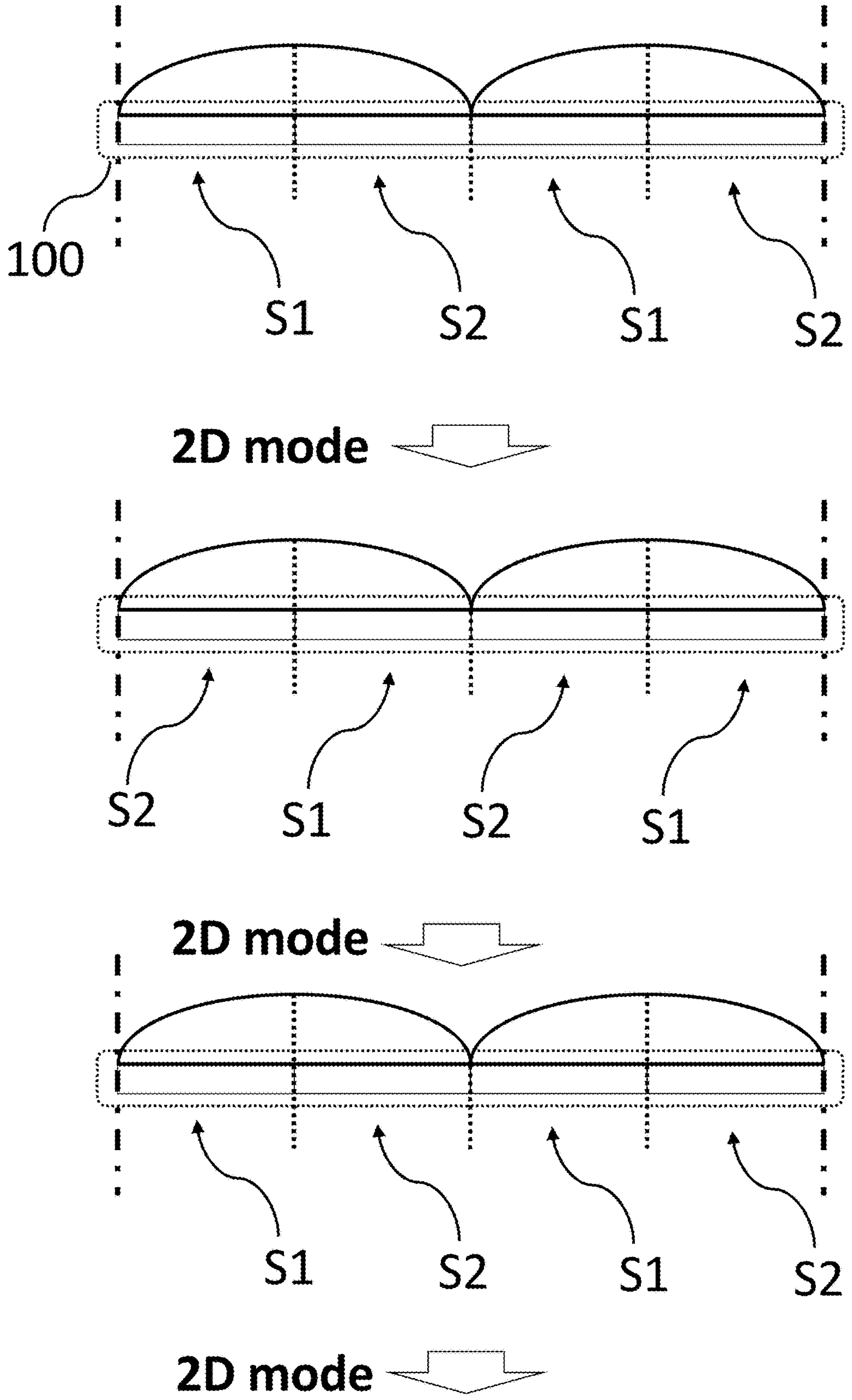

Image segmentation is a process of partitioning a digital image into multiple image segments, also known as image regions or image objects (sets of pixels). The control unit may partition a 2D image into at least two sets of pixels S1 and S2 as shown in FIGS. 3A and 3B (based on their relative positions beneath the parallax unit 200). The control unit may be implemented through software code executed by hardware such as a CPU or GPU. In FIG. 3C, in 2D mode the control unit may further assign the at least two sets of pixels S1 and S2 into different positions at a specified frequency in a rapid and repeated alternating manner. The human brain will interpret them as a single image and fuses corresponding points across the at least two sets of pixels to generate a single 2D perception. In this way, even when the parallax unit 200 cannot be easily removed in 2D mode, the displayed image will not be degraded.

Figure 3D:
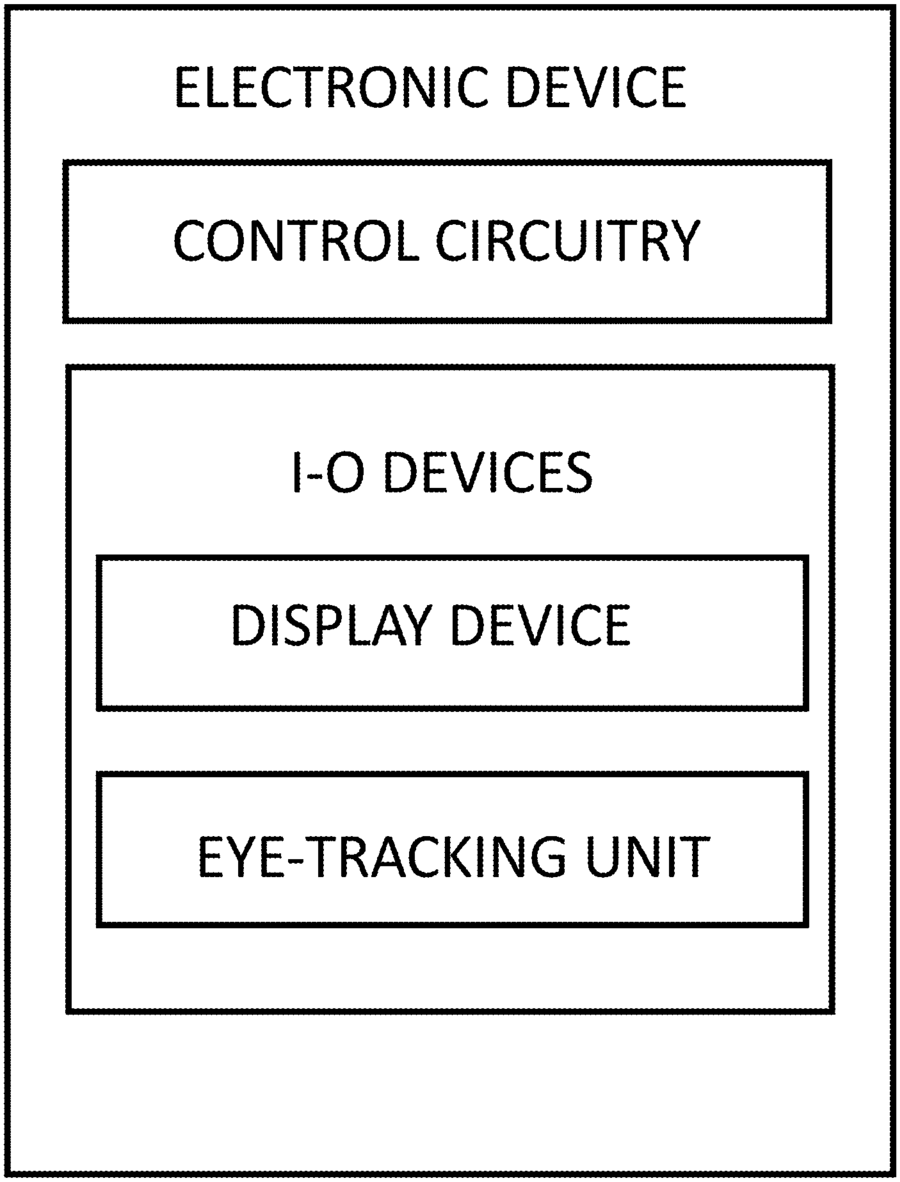

As shown in the schematic diagram of FIG. 3D, the electronic device may include an eye-tracking unit, such as a camera in combination with eye-tracking software, configured to determine the user's position and to partition a two-dimensional image into at least two pixel groups. The electronic device may be a laptop, tablet, smartphone, or a wearable device such as AR/VR headsets or eyeglass-mounted devices. The device may include control circuitry with storage and processing units, such as hard drives, flash memory, RAM, and processors (e.g., microprocessors, DSPs. ASICs), to manage device operations. The control circuitry may include communication modules (e.g., antennas and transceivers) to support wired and wireless communication with external devices via Wi-Fi, Bluetooth, NFC, or cellular networks. The device may also support wireless charging and include a battery. I-O devices may include components such as buttons, microphones, speakers, cameras, sensors, and touchpads, allowing user input and device feedback. The display may be touch-sensitive or not, and implement various touch sensing technologies such as capacitive, optical, or acoustic sensors. Some devices may feature dual displays arranged on opposite sides of the device in a back-to-back configuration. One or both displays may be curved. Sensors may include pressure sensors, audio sensors, ambient light sensors, 3D sensors (e.g., structured light, dual-lens, LiDAR), motion sensors (e.g., accelerometers, gyroscopes, IMUs), biometric and environmental sensors (e.g., temperature, humidity, gaze tracking), and more. The control circuitry may run operating systems and applications, and drive pixel arrays to render content on the display. The display may use technologies such as OLED, LCD, micro-LED, etc., and may have a rectangular, rounded, or curved form. The device may integrate an eye/head tracking system using cameras and sensors to detect the user's gaze or head position and adjust display content accordingly. This system may include infrared or visible light sensors and optional light emitters for scene illumination.

Figure 4A:
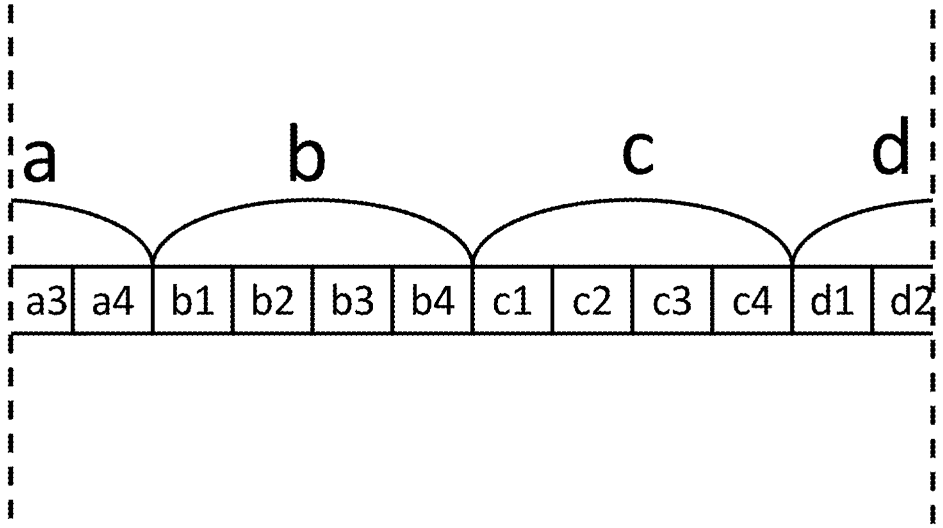
FIGS. 4A-4B depict how to partition a 2D image into at least two pixel groups based on their relative positions beneath the parallax unit.
Figure 4B:
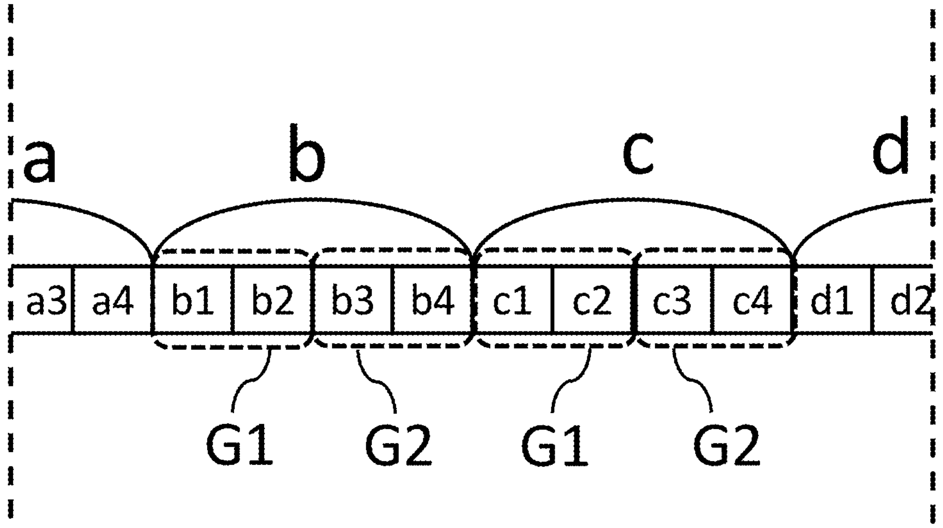

In another embodiment, the parallax unit may be a lenticular lens array. FIG. 4A illustrates a portion of this lenticular lens array (a, b, c, d), where each section covers specific portions of the panel, and each such portion includes multiple pixels (e.g., a3, a4, b1, b2, b3, b4, c1-c4, d1-d4). In 2D mode, as shown in FIG. 4B, the control unit may partition the 2D image into at least two pixel groups G1 and G2 based on the relative position beneath the parallax unit 200. For example, pixel group G1 may include pixels a1 (not shown), a2 (not shown), b1, b2, c1, c2, d1, d2; pixel group G2 may include pixels a3, a4, b3, b4, c3, c4, d3 (not shown), d4 (not shown). The control unit can rapidly and repeatedly alternate between pixel groups G1 and G2 at a predetermined frequency. The viewer's brain will interpret them as a single image, fusing corresponding points to create a single 2D perception.

The lenticular lens array shown in FIGS. 4A and 4B has a curved surface, but other lens shapes or profiles are also possible, such as pyramidal, trapezoidal, parabolic, elliptical, and the like. For example, U.S. patent application Ser. No. 12/997,885 describes envelope curves that define the geometry of polygonal lenses; the envelope curves are segments of circles, although non-circular envelope curves are also disclosed. Additionally, U.S. patent application Ser. No. 13/048,182 describes a plurality of polygonal prism lenses that include a plurality of flat or curved surfaces. Each of the polygonal prism lenses extends longitudinally in a third direction that intersects the second direction.

Figure 5C:
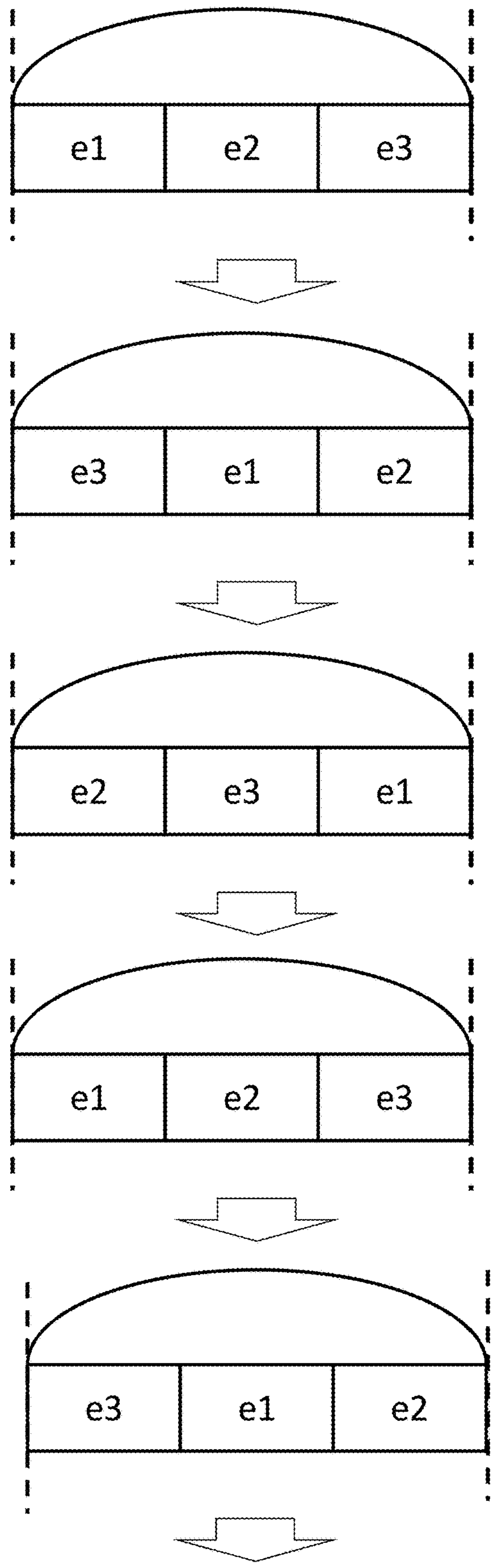

FIGS. 5A and 5B illustrate another embodiment of the invention. In this example, each lenticular lens unit of the lenticular lens array covers panel regions containing pixel content e1, e2, and e3. Depending on the viewing angle, the user may see different pixel content through the same lens (e.g., e2 from the front, or e1/e3 from the sides). As shown in FIG. 5C, by rapidly switching the pixel content (e1, e2, e3), the brain fuses them into a single two-dimensional image without requiring the user to shift their viewing angle.

Figure 6A:
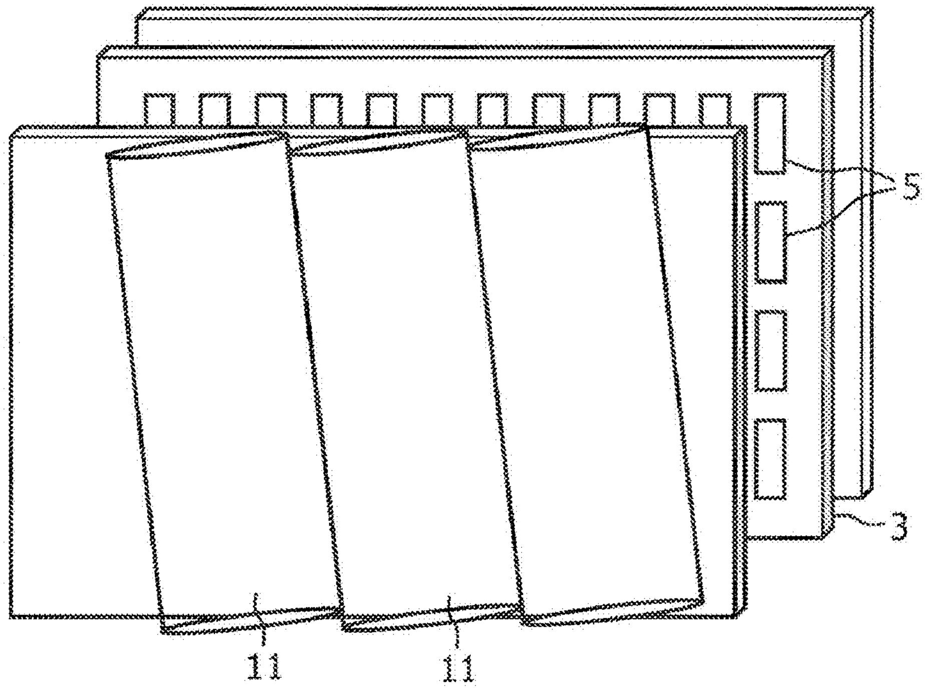
FIGS. 6A-6B illustrate that the jittering direction of the pixel content is perpendicular to the extension direction of the lens elements.

FIG. 6A shows another embodiment of the invention. The display 3 has a rectangular array of pixels 5 arranged in rows and columns. For clarity, only a few pixels are illustrated, though in practice the panel may include several thousand rows and columns. Lens elements 11 shown in the figure have the form of convex cylindrical lenses, functioning as optical output guides to deliver different images or views from the display 3 to the user's eyes. The device 3 may present multiple views in different directions. Each lens element 11 covers a group of pixels 5 and projects those pixels in a specific direction to form a distinct view. As the user's head moves from left to right, their eyes sequentially receive different views. These lens elements may extend in the column direction of the panel (not shown) or be slanted at an angle relative to the columns (as shown in FIG. 6A), where each lens covers one or more adjacent pixels and is angled relative to the pixel column direction.

In certain embodiments, the lenticular lens elements may be slanted at a predetermined angle relative to the column direction of the pixel array on the display panel. Compared to lenticular lenses aligned parallel to the pixel columns, a slanted lens configuration provides several technical benefits. First, by breaking the repetitive alignment between the lens elements and pixel columns, the slanted arrangement effectively reduces visual artifacts such as aliasing and moiré patterns that may otherwise arise from regular pixel structures, thereby improving image clarity and visual stability.

Second, slanted lenses can distribute display pixels more uniformly across multiple viewing zones, enhancing resolution consistency and brightness balance between views, which is particularly advantageous for multiview autostereoscopic displays. Furthermore, when the user moves their head laterally, the slanted configuration enables smoother transitions between different views, reducing view-jumping and improving perceived continuity.

Additionally, the slanted lens design offers greater flexibility in accommodating display panels with non-uniform or non-standard subpixel arrangements. This expands the applicability of the display system across different pixel architectures. Accordingly, the slanted lenticular lens design disclosed herein significantly enhances the image quality and viewing stability of autostereoscopic displays operating in both two-dimensional and three-dimensional modes.

Figure 6B:
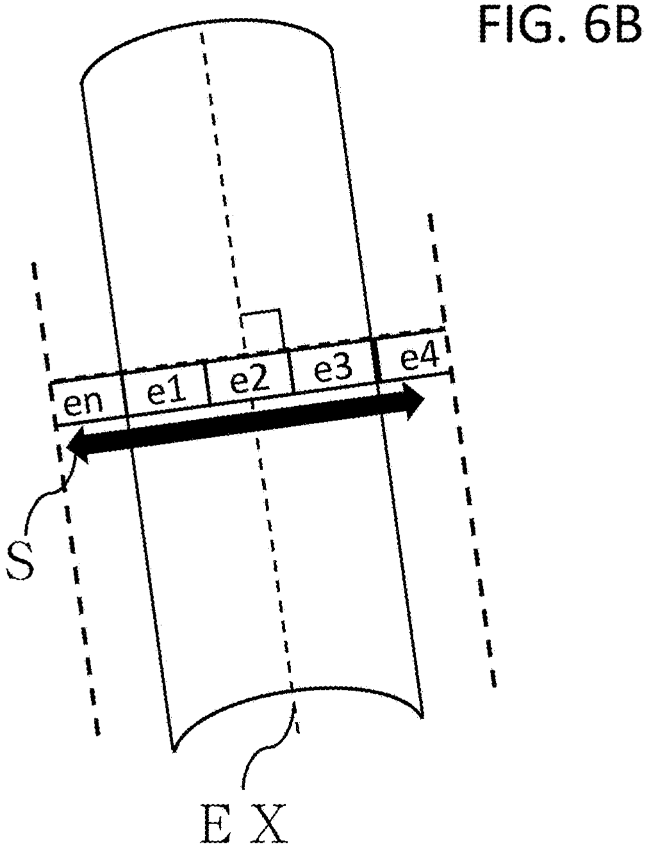

Therefore, when the invention is applied to a stereoscopic image display device having slanted lens elements, the direction in which the pixel content is switched to achieve the optimized 2D display must align with the direction perpendicular to the extension direction of the overlying lens elements, not simply follow the row direction of the panel. For example, as shown in FIG. 6B, the direction S in which the pixel content is jittered is perpendicular to the extension direction EX of the lens elements. Specifically, the control unit selects multiple pixels across different rows and columns of the panel—those aligned perpendicular to the extension direction EX—and sequentially displays the content of pixels e1, e2, e3 to achieve a diagonal jittering effect.

In an embodiment of the electronic device, a portion of the structure is illustrated in the cross-sectional side view and top view shown in FIGS. 7A and 7B. The device includes a display 3 comprising an array of pixels 5 that is covered by a plurality of lenticular lens units 11. The display 3 provides a plurality of independently controllable viewing zones (e.g., v1, v2, v3) based on their relative positions beneath each lenticular lens unit 11. The device further includes control circuitry having a two-dimensional mode configured to render content for the display 3. In the two-dimensional mode, the rendered content includes image segments (e.g., e1, e2, e3) associated with respective viewing zones at a plurality of time periods.

Figure 7C:
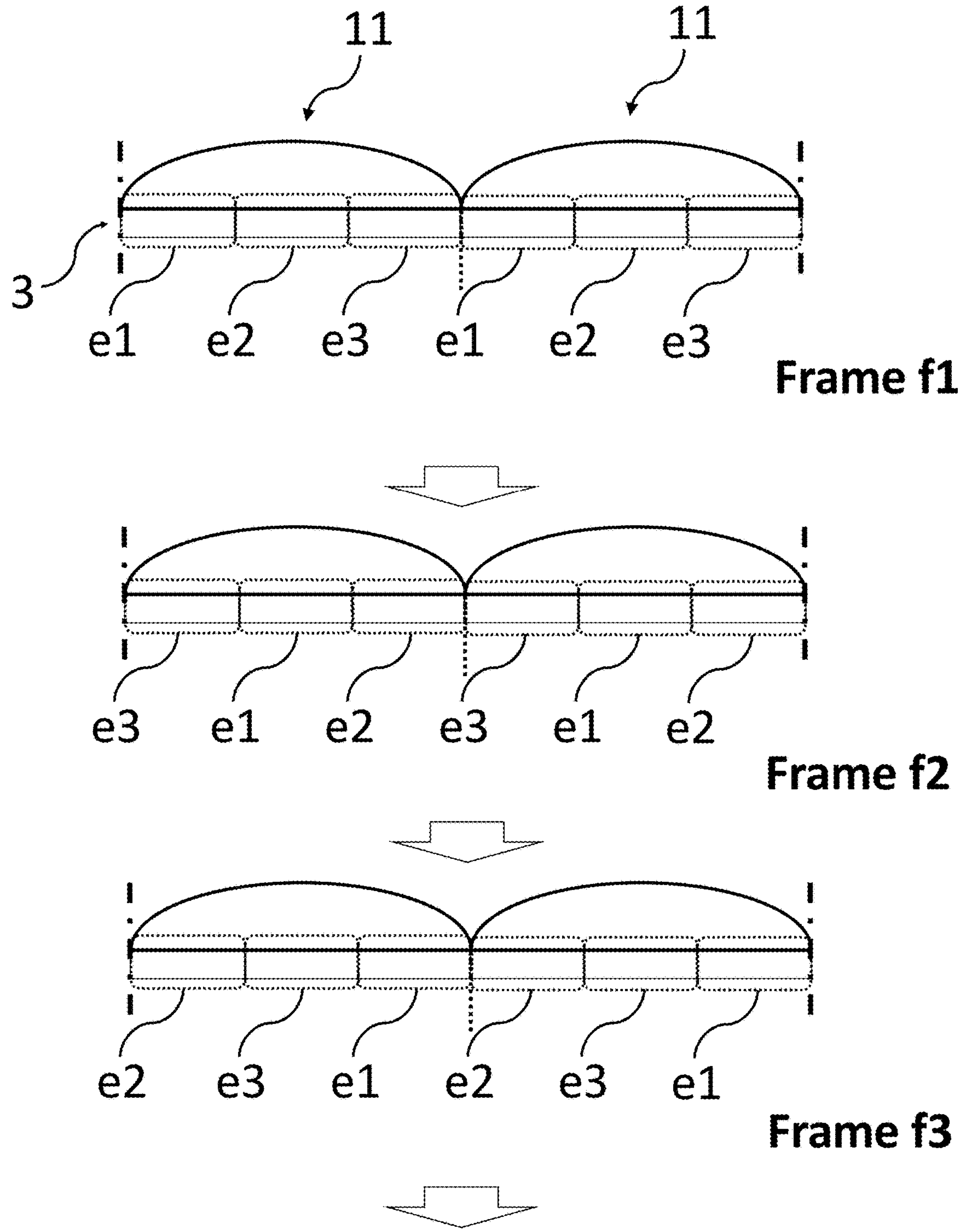

For example, as shown in FIG. 7C, in Frame f1, the rendered content includes image segments e1, e2, and e3 associated with viewing zones v1, v2, and v3, respectively. However, in Frame f2, the image segments associated with viewing zones v1, v2, and v3 are segments e3, e1, and e2, respectively. In other words, the rendered content includes image segments that are associated with different viewing zones across different frames (e.g., time periods).

Thus, the control circuitry may be configured to alternately reassign the image segments to different viewing zones in different frames. For example, for a 60-Hz display, the 60-Hz display can refresh the screen 60 times per second. The control circuitry may render content in a way that when in frame f1, the control circuitry assign image segments e1, e2, e3 to viewing zones v1, v2, v3. When in frame f2, the control circuitry assign image segments e3, e1, e2 to viewing zones v1, v2, v3. When in frame f3, the control circuitry assign image segments e2, e3, e1 to viewing zones v1, v2, v3. When in frame f4 (not shown), the control circuitry assign image segments e1, e2, e3 to viewing zones v1, v2, v3 again. When in frame f5 (not shown), the control circuitry reassign image segments e3, e1, e2 to viewing zones v1, v2, v3 . . . . In short, the image segments (e.g., e1, e2, e3) are associated with respective viewing zones (e.g., v1, v2, v3) and alternately reassigned to different viewing zones at an indicated refresh rate.

The indicated refresh rate may be 24-Hz, 60-Hz, 120-Hz or an "adaptive" refresh rate. Many smartphones have the adaptive refresh rate, which scales up at select times when you're more likely to notice the difference. Say you have an always-on display with a static image or you are watching a movie at 24 fps. There is little point in refreshing the display 120 times per second. A high refresh rate in those circumstances drains the battery faster.

The image segmentation is the process of partitioning a digital image into multiple image segments. The rendered content may include the image segmentation process, configured to partition each two-dimensional image into multiple image segments. The image segments are associated with respective viewing zones and alternately reassigned to different viewing zones at the indicated refresh rate. In other words, the rendered content may include image segments that are associated with different viewing zone at different time periods.

Figure 7D:
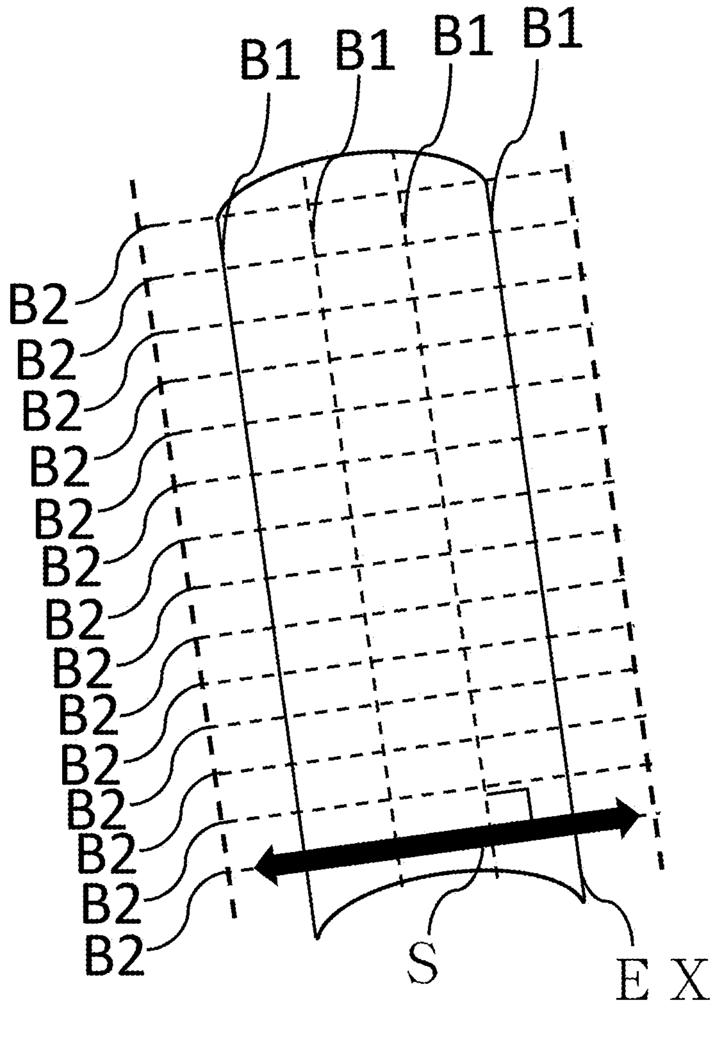
Figure 7E:
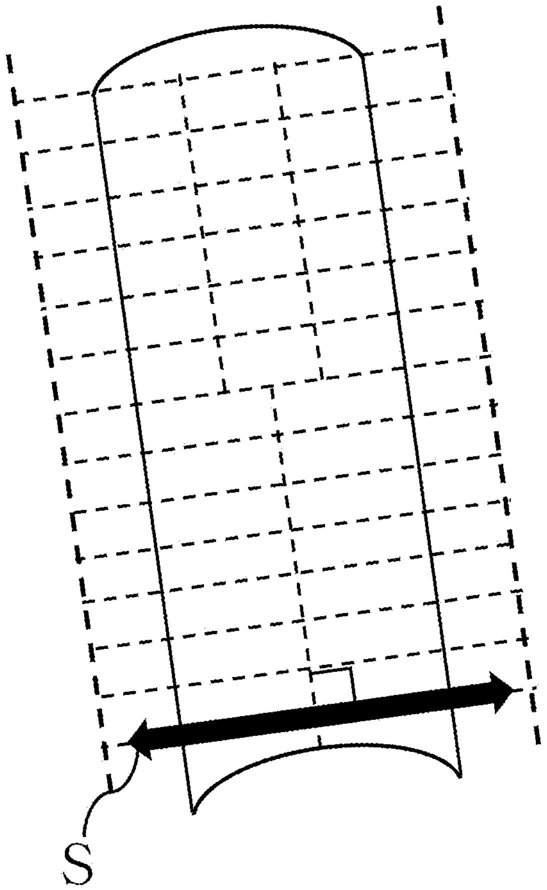

The image segments may have a first set of boundaries (e.g., B1) that are slanted at an angle relative to the columns of display pixels. The boundaries are substantially parallel to the extension direction EX of the lens elements in FIG. 6B. The adjacent boundaries define the image segments to be partitioned. The image segments may further have a second set of boundaries (e.g., B2) that are substantially perpendicular to the first set of boundaries so that the control circuitry may partition each two-dimensional image into multiple image blocks. Each of the image blocks may include different groups of pixels. The control circuitry may be configured to alternately reassign the image blocks to different location at different time periods. The control circuitry may reassign the image blocks to different location in a direction that is substantially perpendicular to the extension direction of the lens elements. The shape and size of the image blocks may differ in different regions as shown in FIG. 7E.

According to another aspect of the present invention, there is provided an electronic device, comprising: a display comprising an array of pixels configured to be covered by a plurality of lenticular lens units; and control circuitry configured with a two-dimensional mode for rendering content on the display, wherein, in the two-dimensional mode: the rendered content includes an image segmentation process configured to partition each two-dimensional image into a plurality of image segments; the image segments are defined by a first set of boundaries slanted at an angle relative to columns of the display pixels, the boundaries being substantially parallel to an extension direction of the lenticular lens units.

The image segments may be further defined by a second set of boundaries substantially perpendicular to the first set, forming a plurality of image blocks; each image block comprises a group of pixels; the control circuitry is configured to alternately reassign the image blocks to different locations at different time periods; and the reassignment is performed in a direction substantially perpendicular to the extension direction of the lenticular lens units, wherein shapes and sizes of the image blocks may vary across different regions of the display.

In another embodiment, the electronic device may comprise: the display 3 that includes an array of pixels 5 and a lenticular lens film (e.g., an array of lenticular lens units 11) formed over the array of pixels 5, wherein the display 3 has a plurality of independently controllable viewing zones; and the control circuitry that has separate monoscopic and stereoscopic modes, configured to: render content for the display. When in monoscopic modes, the rendered content may include two-dimensional image segments that are each associated with a respective viewing zone; and the control circuitry may alternately switch the two-dimensional image segments between the viewing zones at indicated refresh rate.

In another embodiment, the electronic device may comprise: the display 3 that includes the array of pixels 5 for the lenticular lens film to cover, wherein the display 3 has a plurality of independently controllable viewing zones based on their relative positions beneath the lenticular lens film; and the control circuitry that has separate monoscopic and stereoscopic modes, configured to render content for the display: when in stereoscopic modes, the rendered content includes three-dimensional images that are each associated with a respective viewing zone and simultaneously present said three-dimensional images; and when in monoscopic modes, the rendered content includes two-dimensional image segments and the control circuitry is configured to alternately switch the two-dimensional image segments between the viewing zones at indicated refresh rate.

Please note that the shape and size of the viewing zones in stereoscopic modes may differ from those in monoscopic modes. For example, although in FIG. 3 the viewing zones in monoscopic mode have the same shape and size as those in stereoscopic mode shown in FIG. 1B, in another embodiment—shown in FIGS. 7A and 7B—the shape and size of the viewing zones in stereoscopic mode are different from those in monoscopic mode. Each lenticular lens unit is associated with three independently controllable viewing zones, and the control circuitry is configured to support at least three combinations for alternately reassigning the image segments to different viewing zones at different time periods. The viewing zones may have zone boundaries that are slanted at an angle relative to the columns of display pixels. The zone boundaries are substantially parallel to the extension direction of the lens elements in FIG. 6B. The adjacent zone boundaries define the viewing zones to be used.

In another embodiment, the electronic device may comprise: the display 3 that includes the array of pixels 5 for a plurality of lenticular lens units to cover, wherein the display 3 has a plurality of independently controllable viewing zones based on their relative positions beneath each of the plurality of lenticular lens units; and the control circuitry that has the monoscopic mode, configured to render content for the display 3, wherein in the monoscopic mode, the rendered content includes two-dimensional image segments that are each associated with the respective viewing zone and alternately reassign said two-dimensional image segments to different viewing zones.

In another embodiment, the electronic device may comprise: the display 3 that includes the array of pixels 5 for a plurality of lenticular lens units to cover, wherein the display 3 has a plurality of independently controllable viewing zones based on their relative positions beneath each of the plurality of lenticular lens units; and the control circuitry that has a two-dimensional mode, configured to render content for the display 3, wherein in the two-dimensional mode, the rendered content includes two-dimensional image segments that are each associated with the respective viewing zone and alternately reassign said two-dimensional image segments to different viewing zones.

In another embodiment, the electronic device may comprise: the display 3 that includes the array of pixels 5 for a plurality of lenticular lens units to cover, wherein the display 3 has a plurality of independently controllable viewing zones based on their relative positions beneath each of the plurality of lenticular lens units; and the control circuitry that has a two-dimensional mode, configured to render content for the display, wherein in the two-dimensional mode, the rendered content includes image segments that are associated with the respective viewing zone and alternately reassign said image segments to different viewing zones.

In another embodiment, the electronic device may comprise: the display 3 including the array of pixels 5 configured to be covered by a plurality of lenticular lens units, the display 3 having a plurality of independently controllable viewing zones based on relative positions beneath each of the plurality of lenticular lens units; and the control circuitry having the two-dimensional mode and configured to render content for the display 3. In the two-dimensional mode, the rendered content includes image segments respectively associated with the viewing zones, and the control circuitry is further configured to alternately reassign the image segments to different viewing zones.

In another embodiment, a method may reduce image degradation of a 2D mode on a 2D/3D switchable stereoscopic display (which may use lenticular lenses or other parallax units). The stereoscopic display may include the array of display pixels 5 arranged in rows and columns; and an array of elongated optical elements extending parallel to one another and overlying the display pixels 5. In 3D modes, separate the pixels 5 below the array of elongated optical elements into two or more pixel sets, through which the pixel sets are viewed, the optical elements acting as optical directing means to provide separate image regions to a viewer's eyes at separate viewpoints, but when in the 2D mode, switches contents of the image regions to be displayed at a certain timing (to display one of said two or more image regions in each of the image regions) such that at a first timing a first set of said contents is presented by the optical elements at a first viewpoint, and a second set of said contents is presented by the optical elements at the second viewpoint, at a second timing a second set of said contents is presented by the optical elements at the first viewpoint, and a first set of said contents is presented by the optical elements at the second viewpoint.

In another embodiment, the method for displaying a two-dimensional image may comprise the steps of: allocating a plurality of image regions, by separating the pixels below an array of elongated optical elements into two (or more) pixel sets, through which the pixel sets are viewed, the optical elements acting as optical directing means to provide separate image regions to a viewer's eyes at separate viewpoints, switching the contents of the plurality of image regions to be displayed at two (or more) timing repeatedly such that at a first timing a first set of said contents is presented by the optical elements at a first viewpoint, and a second set of said contents is presented by the optical elements at the second viewpoint, at a second timing a second set of said contents is presented by the optical elements at the first viewpoint, and a first set of said contents is presented by the optical elements at the second viewpoint.

Figure 8:
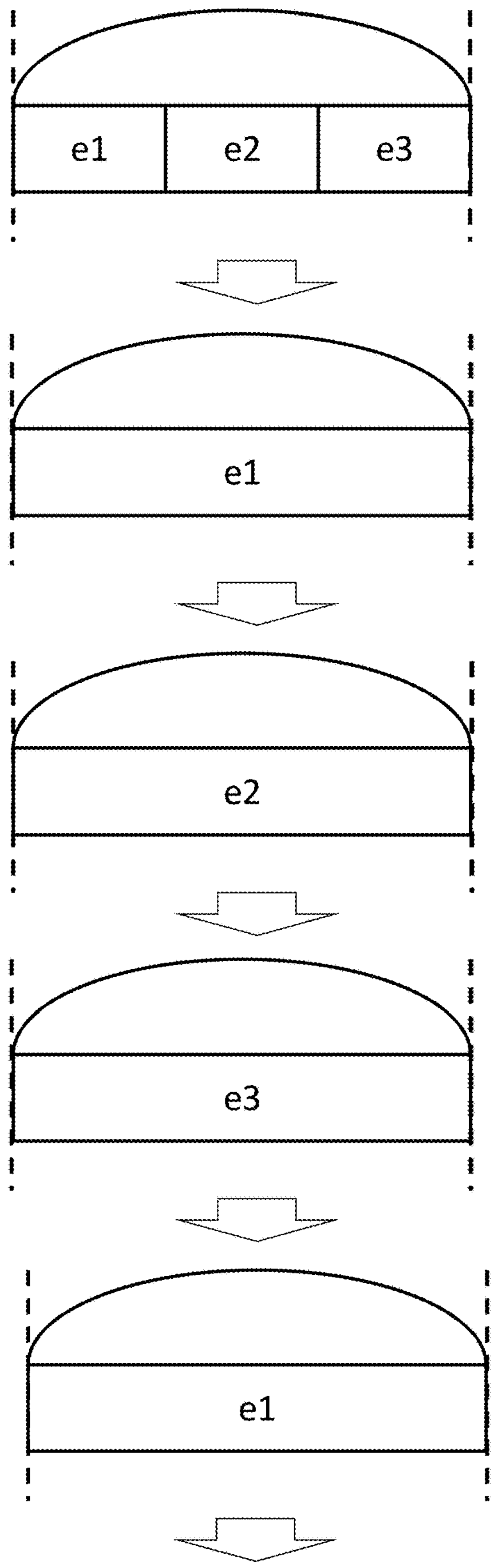
FIG. 8 illustrates another embodiment in which the display panel may sequentially present the pixel contents covered beneath each lenticular lens element.

In another embodiment of the present invention, the display panel may sequentially present pixel content (e.g., e1, e2, e3) that is located beneath each lenticular lens element. FIG. 8 is a conceptual illustration showing an electronic device comprising a display that includes an array of pixels covered by a plurality of lenticular lens units. The display defines a plurality of independently controllable viewing zones based on the relative positions beneath each of the lens units. The device also comprises control circuitry having a two-dimensional mode configured to render content for the display. In the two-dimensional mode, the rendered content includes a first set of image segments (e.g., e1) and a second set of image segments (e.g., e2), based on their respective positions beneath each of the lens units. The display is configured to repeatedly present the first and second sets of image segments in alternation, rather than presenting the original image segments simultaneously.

Figure 9:
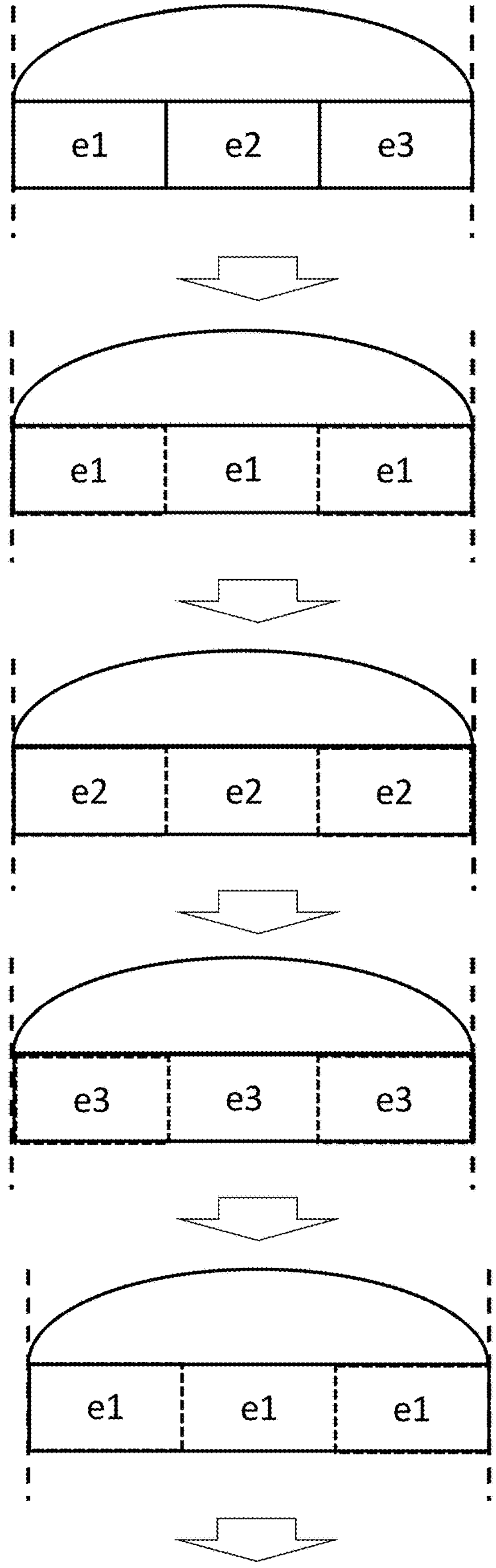
FIG. 9 is a conceptual diagram illustrating an optional sequential presentation mode, in which each set of image segments is displayed across all viewing zones in turn.

An optional operation is illustrated in FIG. 9, in which the contents originally associated with image segments e1, e2, and e3 are sequentially displayed as follows: e1, e1, e1; e2, e2, e2; e3, e3, e3; and so on. In other words, while the display originally presents multiple sets of image segments simultaneously across respective viewing zones, it is alternatively configured to sequentially present each set of image segments across all of the viewing zones in turn. The electronic device may comprise a display that includes an array of pixels configured to be covered by a plurality of lenticular lens units. The display defines a plurality of independently controllable viewing zones based on their relative positions beneath the lenticular lens units. The device also comprises control circuitry having a two-dimensional mode configured to render content for the display. In the two-dimensional mode, the rendered content includes a first set of image segments and a second set of image segments, based on their relative positions beneath the lenticular lens units. The display is configured to repeatedly present the first and second sets of image segments across each of the viewing zones in a sequential manner.

Figure 10:
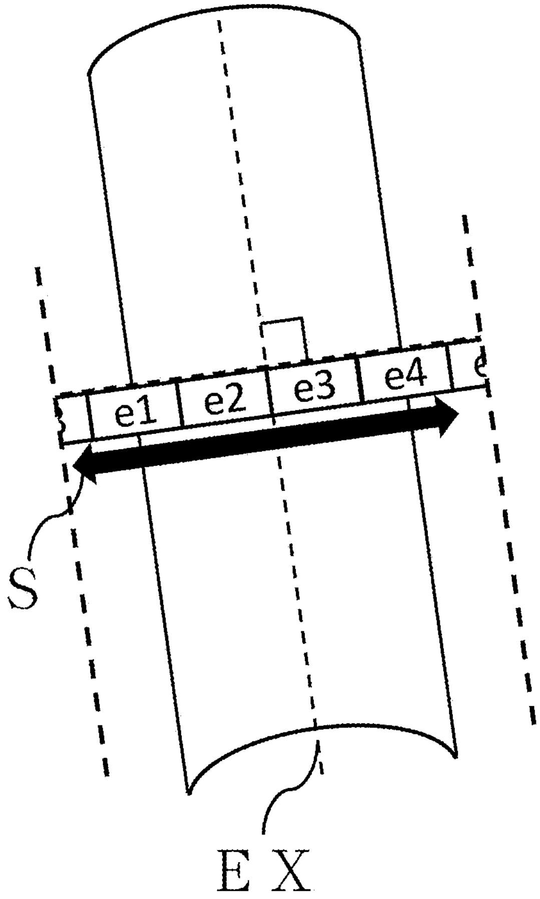
FIG. 10 presents another embodiment in which the control unit selects multiple sets of pixels that are relatively completely covered.

In another embodiment of the present invention, as illustrated in FIG. 10, the portion of the display panel that is covered by each lenticular lens unit may not be sufficient to fully encompass all the required pixel contents (e.g., e1, e2, e3). In such cases, the control circuitry may be configured to select a plurality of pixel groups—each relatively completely covered by a respective lenticular lens unit—to serve as the sources for the jittered pixel contents. Specifically, three such pixel groups may be selected and individually assigned to jittered contents e1, e2, and e3. This configuration ensures that even when spatial coverage by a lens unit is limited, suitable pixel content can still be rendered with appropriate angular offset, thereby preserving the effectiveness of the two-dimensional mode.

In short, when a portion of the display panel covered by a single lenticular lens unit does not fully encompass all required pixel content, the control circuitry is configured to: select a plurality of pixel groups, each relatively completely covered by a respective lenticular lens unit; and assign each of the pixel groups to a corresponding jittered image segment to be presented on the display.

According to another aspect of the present invention, there is provided an electronic device, comprising: a display comprising an array of pixels configured to be covered by a plurality of lenticular lens units, wherein the display defines a plurality of independently controllable viewing zones based on relative positions of the pixels beneath each of the lenticular lens units; and control circuitry configured with a two-dimensional mode for rendering content on the display, wherein, when a portion of the display covered by a single lenticular lens unit does not fully encompass all required pixel content, the control circuitry is configured to: select a plurality of pixel groups, each relatively completely covered by a respective lenticular lens unit; and assign each of the pixel groups to a corresponding jittered image segment to be presented on the display.

Figure 11:
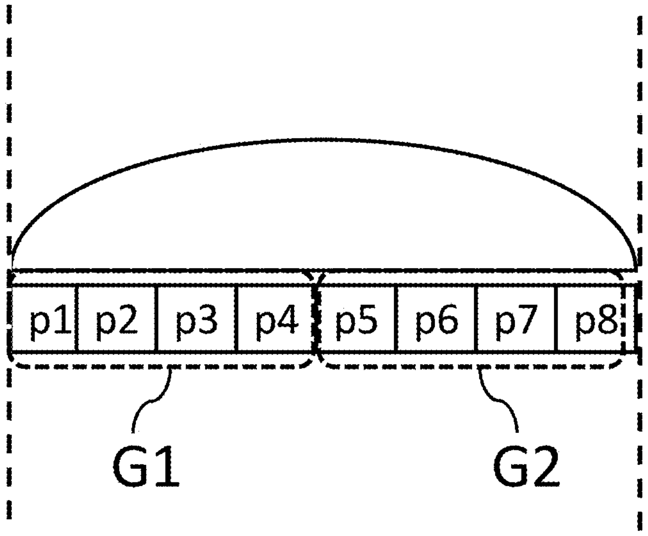
FIG. 11 presents another embodiment in which the control unit divides the covered pixels into multiple groups.
Figure 12:
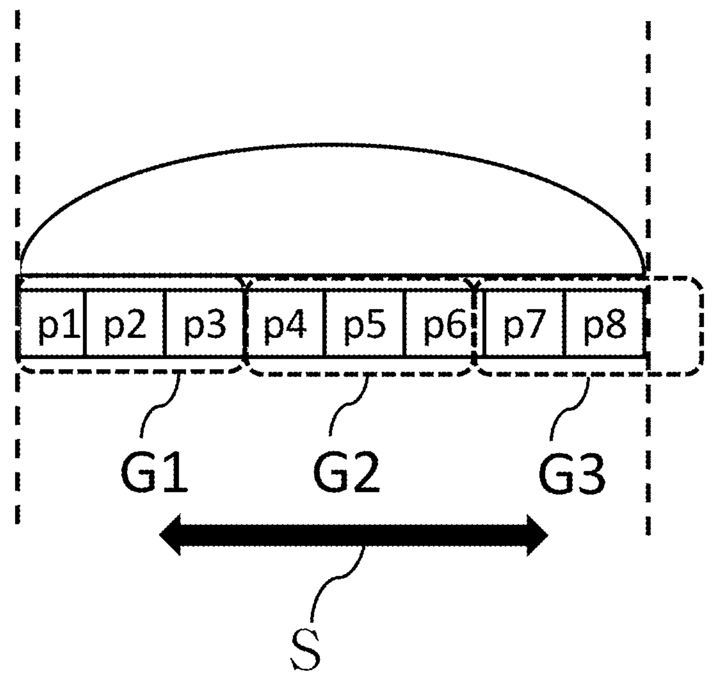
FIG. 12 presents another embodiment in which the pixels are grouped into at least three sets and jittered diagonally in a direction perpendicular to the extension direction.

In another embodiment, as shown in FIG. 11, if more than three pixels are covered beneath each lens unit, the control unit may divide the covered pixels into multiple groups, and then perform diagonal jittering in a direction perpendicular to the extension direction EX of the lens elements. In yet another embodiment (see FIG. 12), the pixels may be grouped into at least three sets and jittered diagonally in the direction perpendicular to the extension direction EX of the lens elements.

Figure 13:
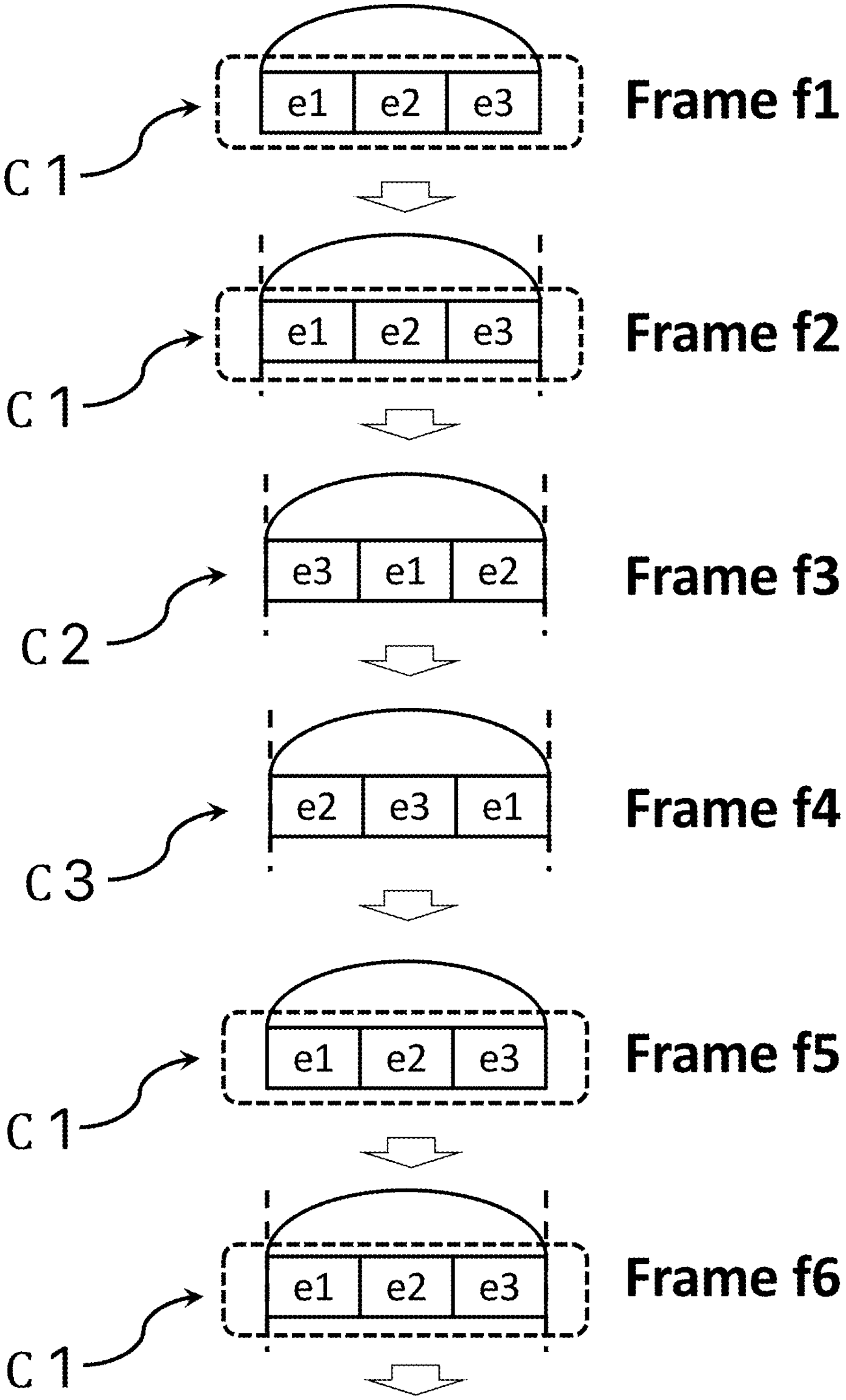
FIG. 13 is a conceptual diagram illustrating an example in which different combinations of image segments are assigned to a plurality of frames, and one combination is presented more frequently than other combinations to improve visual consistency and user experience.

Regarding the frequency of "repeated switching of pixel contents," such as in a display operating at 24 frames per second (fps), the allocation ratio of pixel content combinations (e.g., e1, e2, e3 vs. e3, e1, e2 vs. e2, e3, e1) may vary. In one embodiment, as shown in FIG. 13, the pixel content combination c1 (e1, e2, e3), which corresponds to the relative positions beneath the parallax unit (lens element), may be assigned a higher number of frames compared to other combinations such as c2 (e3, e1, e2) or c3 (e2, e3, e1). In this way, the user may see more combinations of the original content (e.g., c1) than other modified combinations.

In other words, the electronic device may comprise a display that includes an array of pixels for a plurality of lenticular lens units to cover, wherein the display has a plurality of independently controllable viewing zones based on their relative positions beneath each of the lens units; and a control circuitry that has a two-dimensional mode, configured to render content for the display, wherein, in the two-dimensional mode, the rendered content includes a first set of image segments (e.g., e1), a second set of image segments (e.g., e2), and a third set of image segments (e.g., e3) based on their relative positions beneath each of the lens units; a plurality of frames to be presented, each having a different combination (e.g., e1, e2, e3) of the sets of image segments to be displayed on the different viewing zones; and wherein the display is configured to present one of the combinations of the sets of image segments in a greater number of frames than the other combinations.

According to another aspect of the present invention, there is provided an electronic device, comprising: a display comprising an array of pixels configured to be covered by a plurality of lenticular lens units, wherein the display defines a plurality of independently controllable viewing zones based on the relative positions of the pixels beneath each of the lenticular lens units; and control circuitry configured with a two-dimensional mode for rendering content on the display, wherein, in the two-dimensional mode: the rendered content includes a first set of image segments, a second set of image segments, and a third set of image segments, based on their respective positions beneath each of the lenticular lens units; a plurality of frames are generated, each frame comprising a different combination of the sets of image segments assigned to different viewing zones; and the display is configured to present one of the combinations of the sets of image segments in a greater number of frames than one or more of the other combinations.

Figure 14A:
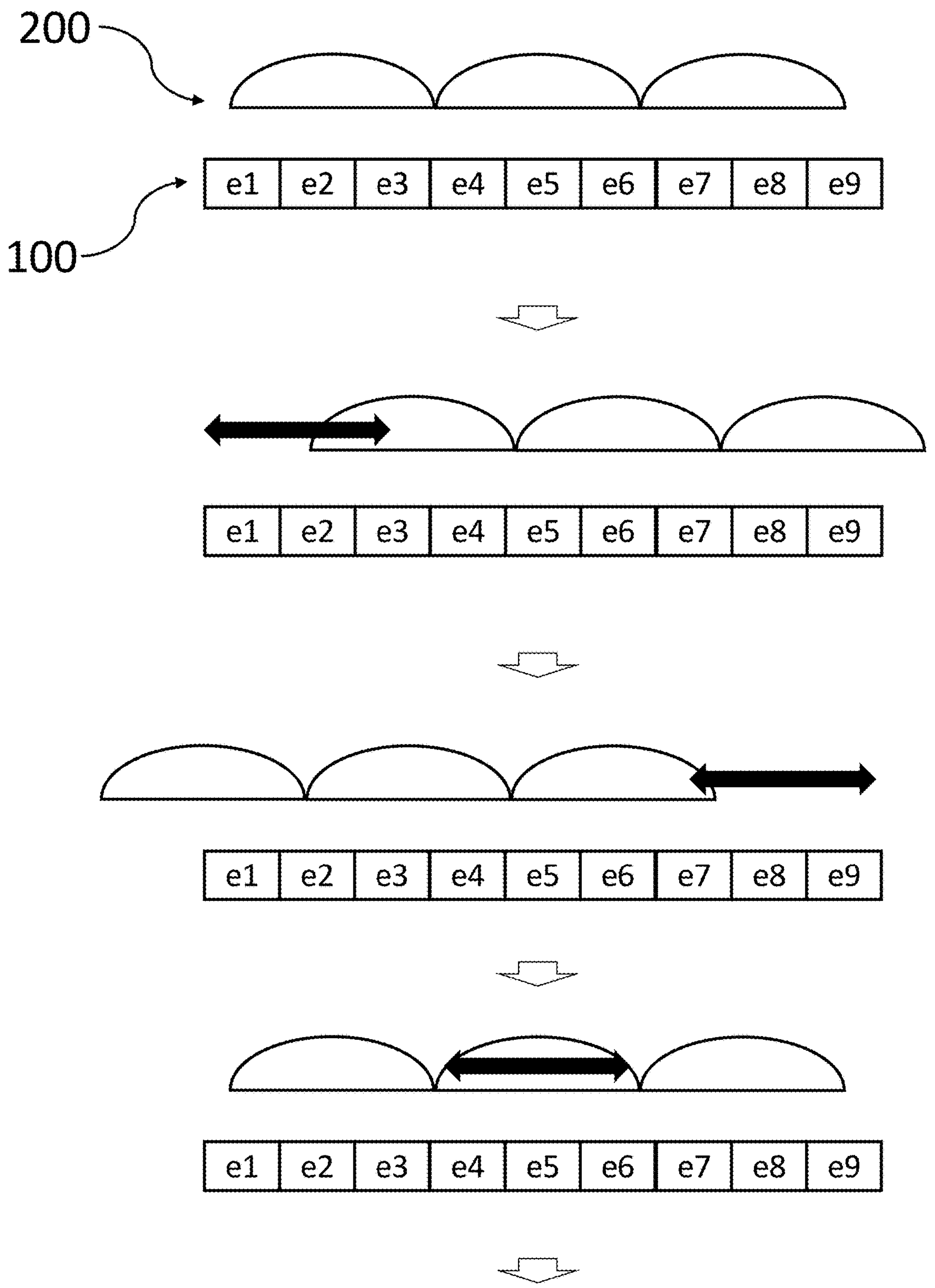
FIGS. 14A-14B present how the same effect may be achieved through lateral shifting operations.
Figure 14B:
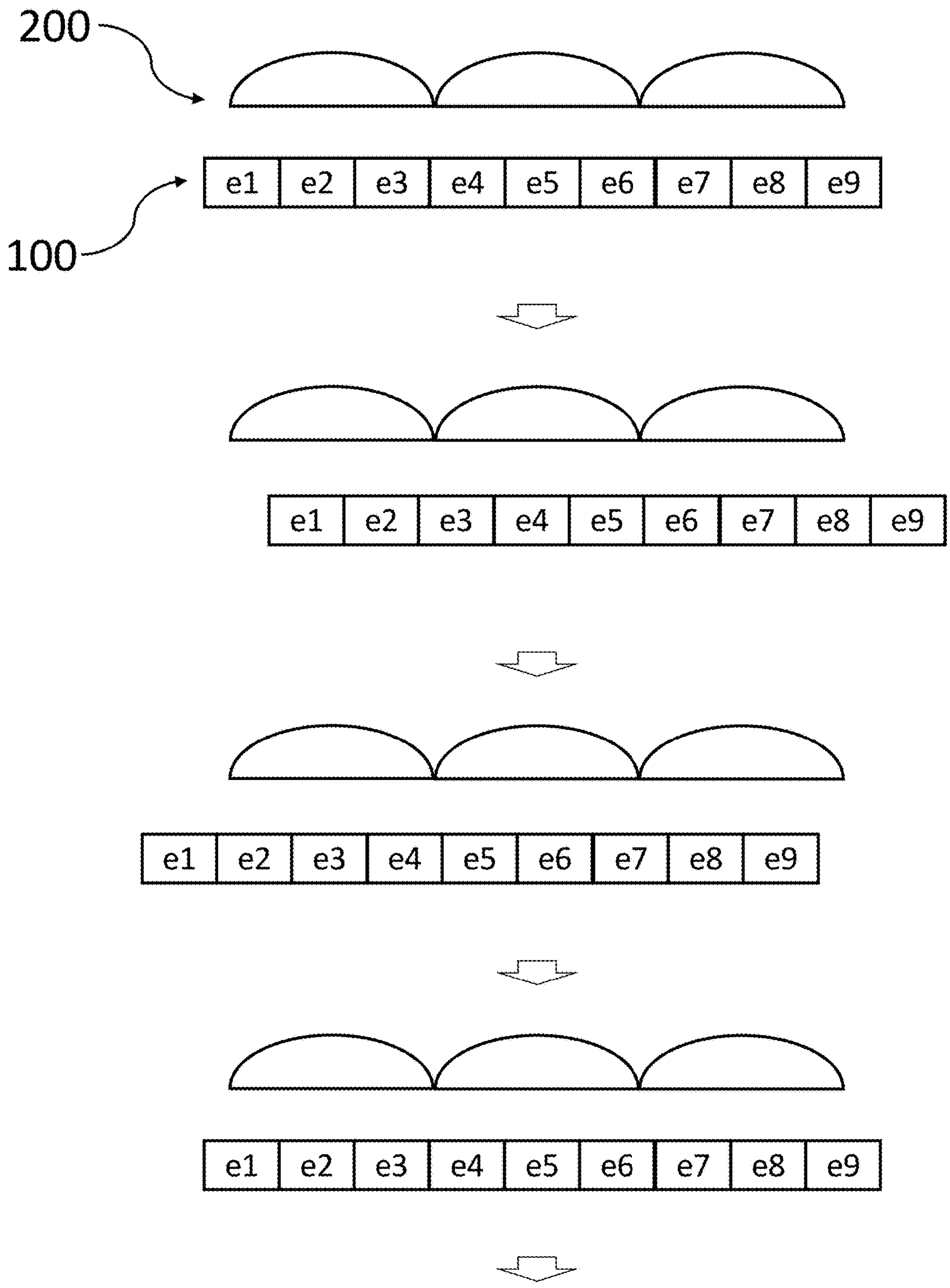

In another embodiment of the invention, as illustrated in FIG. 14A, the desired effect may also be achieved by physically vibrating the parallax unit 200 positioned above the pixel contents of the display panel 100. In yet another embodiment, shown in FIG. 14B, the same effect may be achieved by having the control unit instruct the pixel contents of display panel 100 to rapidly and repeatedly shift laterally relative to the overlying parallax unit 200.

Figure 15A:
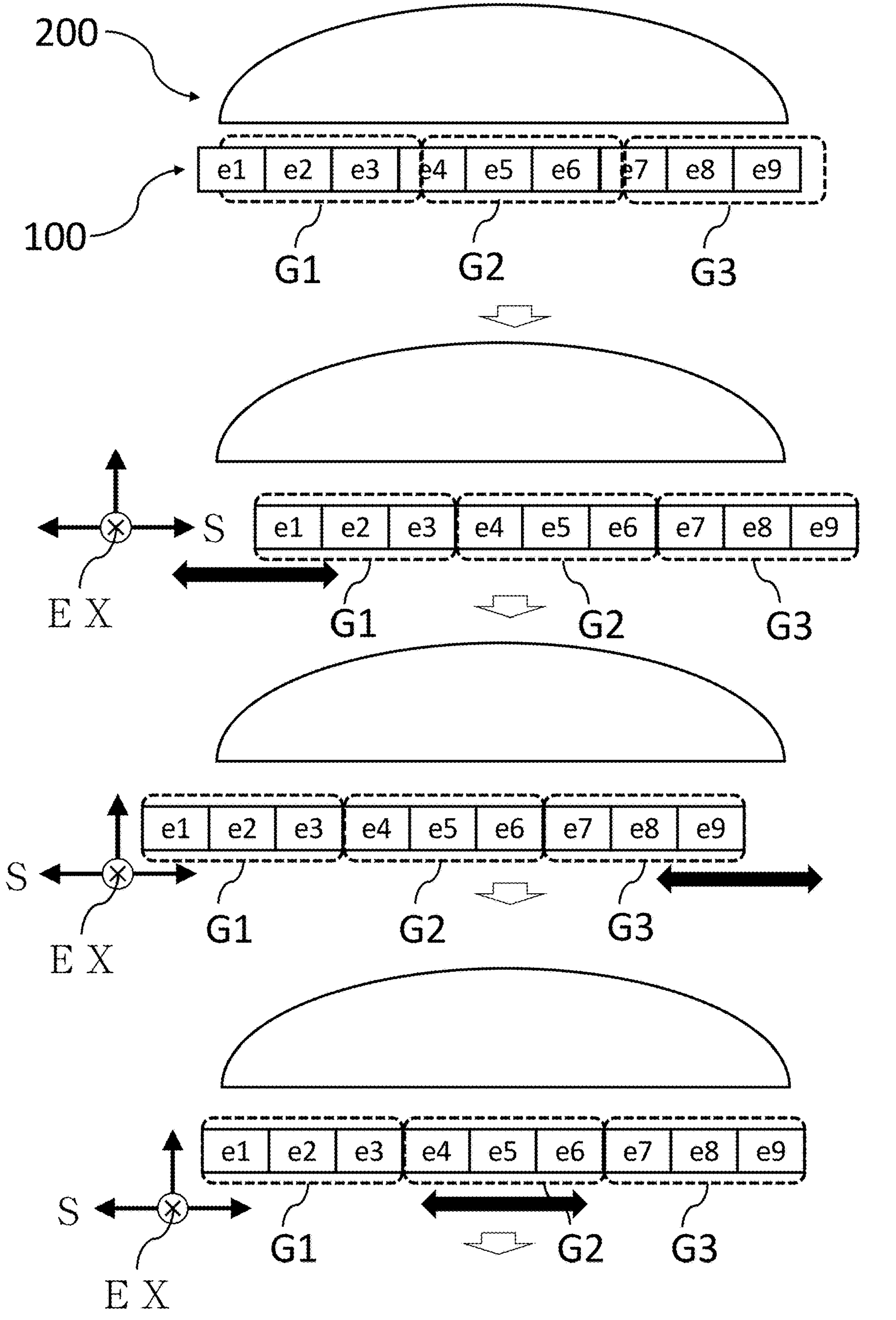
FIGS. 15A-15B present another embodiment for performing sequential or randomized replacement of grouped pixel contents.

In another embodiment, the pixels of the display panel 100 beneath each lens unit of the parallax unit 200 may be grouped based on their positions. As shown in FIG. 15A, approximately nine pixels may be located beneath each lens unit. The contents of these nine pixels may be sequentially defined as: e1, e2, e3, e4, e5, e6, e7, e8, e9. These may be grouped into at least two or more groups (e.g., three groups: G1, G2, G3). The control unit may then perform jittering on the grouped pixels in a direction perpendicular to the extension direction EX of each lens unit.

According to another aspect of the present invention, there is provided an electronic device, comprising: a display comprising an array of pixels; a parallax unit comprising a plurality of lenticular lens elements disposed above the display; and control circuitry configured with a two-dimensional mode for rendering content on the display, wherein, in the two-dimensional mode: the control circuitry is configured to generate a jittered visual effect by either: (a) causing the parallax unit to physically vibrate relative to the pixel array of the display; or (b) causing the pixel content of the display to laterally shift relative to the parallax unit in a repeated manner.

According to another aspect of the present invention, there is provided an electronic device, comprising: a display comprising an array of pixels configured to be covered by a plurality of lenticular lens units; and control circuitry configured with a two-dimensional mode for rendering content on the display, wherein, in the two-dimensional mode: pixels located beneath each lenticular lens unit are grouped into a plurality of pixel groups based on their positions; and the control circuitry is configured to perform jittering on the grouped pixels in a direction perpendicular to an extension direction of the corresponding lenticular lens unit.

According to another aspect of the present invention, there is provided an electronic device, comprising: a display comprising an array of pixels; a parallax unit comprising a plurality of lenticular lens elements disposed above the display; and control circuitry configured with a two-dimensional mode for rendering content on the display, wherein, in the two-dimensional mode: the pixels located beneath each lenticular lens element are grouped into a plurality of pixel groups based on their positions beneath the respective lens element; and a jittered visual effect is produced by: (a) causing the parallax unit to vibrate in a direction perpendicular to an extension direction of the lenticular lens elements; or (b) causing the grouped pixel content to shift in said perpendicular direction relative to the parallax unit.

Figure 15B:
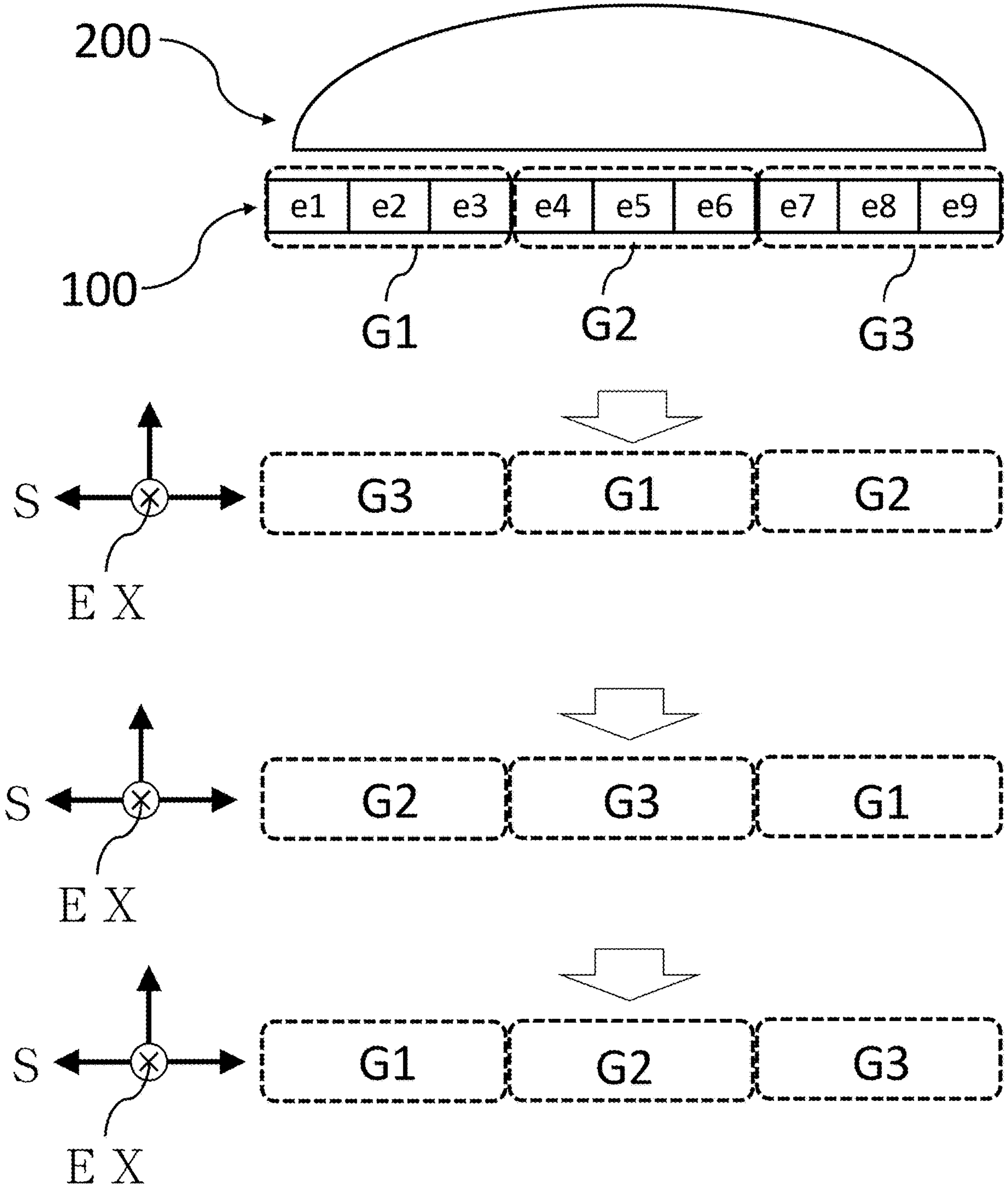

In another embodiment, the pixels of the display panel 100 beneath each lens unit of the parallax unit 200 may again be grouped based on position. As shown in FIG. 15B, approximately nine pixels may lie beneath each lens unit, and their contents may be defined as e1 through e9. These may be grouped into at least two or more groups (e.g., three groups: G1, G2, G3). The control unit may then perform sequential (or randomized) replacement of the grouped pixel contents in a direction perpendicular to the extension direction EX of each lens unit. This enables the viewer to perceive a single fused 2D image without needing to change their viewing angle, thereby enhancing perceived image quality in 2D mode.

According to another aspect of the present invention, there is provided an electronic device, comprising: a display comprising an array of pixels configured to be covered by a plurality of lenticular lens units; and control circuitry configured with a two-dimensional mode for rendering content on the display, wherein, in the two-dimensional mode: pixels located beneath each lenticular lens unit are grouped into a plurality of pixel groups based on their positions beneath the respective lens unit; the control circuitry is configured to sequentially or randomly replace the contents of the grouped pixels in a direction perpendicular to an extension direction of the corresponding lenticular lens unit; and the replacement causes a fused two-dimensional image to be perceived from a fixed viewing position.

According to another aspect of the present invention (in FIGS. 7D, 7E and 15B), there is provided a method for rendering content on an autostereoscopic display in a two-dimensional mode, comprising: partitioning a two-dimensional image into a plurality of image segments using an image segmentation process; defining the image segments with a first set of boundaries slanted at an angle relative to columns of display pixels, the boundaries being substantially parallel to an extension direction of lenticular lens units positioned over the display; further defining the image segments with a second set of boundaries substantially perpendicular to the first set, thereby forming a plurality of image blocks; assigning each image block to a group of pixels in the display; alternately reassigning the image blocks to different locations at different time periods; and performing the reassignment in a direction substantially perpendicular to the extension direction of the lenticular lens units, wherein the shapes and sizes of the image blocks vary across different regions of the display.

In some embodiments, the shapes and sizes of the image blocks may vary across different regions of the display. This variation may be implemented to compensate for optical distortion introduced by the curvature or alignment inconsistencies of the lenticular lens units, especially near the peripheral regions of the display panel. By adjusting the geometry of the image blocks in specific regions, the system may achieve improved angular alignment between pixel content and the optical directionality of the lenses.

Additionally, the adaptive sizing of image blocks allows the rendering system to maintain consistent image fusion quality across the display, thereby minimizing visible artifacts such as ghosting or motion instability in two-dimensional viewing mode. For instance, smaller image blocks may be utilized in areas requiring higher spatial precision, while larger blocks may be used in regions that benefit from enhanced brightness uniformity. Such flexibility further enables the system to support non-standard screen geometries, including curved displays or tiled modular panels, by dynamically reconfiguring block dimensions in accordance with localized optical behavior. As a result, the overall perceived image quality and visual comfort for the viewer can be significantly improved without requiring physical modification of the lens structure.

According to another aspect of the present invention (in FIGS. 1A, 1B, 3B and 3C), there is provided a method for operating a display having a plurality of pixels and overlaid by a plurality of lenticular lens units, the method comprising: operating the display in a stereoscopic mode, wherein three-dimensional images are rendered, each associated with a respective viewing zone beneath the lenticular lens units, and the three-dimensional images are simultaneously presented on the respective viewing zones; and operating the display in a monoscopic mode, wherein a two-dimensional image is partitioned into a plurality of image segments using an image segmentation process, and the image segments are alternately switched between the viewing zones at an indicated refresh rate.

In some embodiments, the shape of the viewing zones in the stereoscopic mode is different from that in the monoscopic mode. This difference in zone geometry enables the system to optimize visual performance for the specific viewing requirements of each mode. For example, in stereoscopic mode, narrower or more angular viewing zones may be employed to ensure precise image separation between the left and right eyes, thereby reducing crosstalk and enhancing the three-dimensional effect. In contrast, during monoscopic operation, the viewing zones may be reconfigured to be wider or more symmetrical, which allows for greater tolerance to viewer movement and provides a more stable and uniform two-dimensional viewing experience.

By adapting the viewing zone shape based on the active display mode, the system can simultaneously support high-quality stereoscopic rendering and robust monoscopic display performance without requiring removal or reconfiguration of the parallax unit. Furthermore, this approach can reduce moiré patterns, improve perceived brightness in 2D mode, and enhance visual comfort across different viewing angles. The foregoing exemplary embodiments are merely exemplary and are not to be construed as limiting the present invention.

The invention discloses the method and electronic device for optimizing 2D image display in autostereoscopic systems without removing the parallax unit 200 (e.g., lenticular lens 11 array). The system may include the image panel 100, the parallax unit 200 positioned in front of it, and control circuitry. In 3D mode, the system displays directional images for left and right eye separation. In 2D mode, it improves image quality by classifying pixels 5 beneath the parallax unit 200 into multiple groups and applying diagonal jitter in the direction S perpendicular to the lens extension.

In certain embodiments, the control circuitry is configured to apply diagonal jitter to the image content rendered beneath the lenticular lens units 11. The term "diagonal jitter" refers to the intentional and repeated shifting of pixel content in the direction that is substantially perpendicular to the extension direction EX of the lenticular lens elements. This operation causes different image segments (e.g., e1, e2, e3) to be reassigned across different pixel groups over multiple time intervals, producing a temporal blending effect that allows the human visual system to perceive a fused two-dimensional image. By jittering the content diagonally, the system reduces the risk of directional aliasing, parallax mismatch, and ghosting artifacts that are common in conventional autostereoscopic displays. Diagonal jitter thus enhances image uniformity in monoscopic mode and improves viewing stability without requiring physical removal or alteration of the parallax unit. This technique may be implemented in software-controlled display drivers.

Additionally, the system uses image segmentation to divide a 2D image into multiple segments, each mapped to specific viewing zones (e.g., v1, v2, v3) and dynamically reassigned at a defined refresh rate. These image segments have slanted boundaries relative to the columns of display pixels 5. According to an aspect of the present invention, there is provided an electronic device, comprising: a display that includes an array of pixels for a plurality of lenticular lens units to cover, wherein the display has a plurality of independently controllable viewing zones based on their relative positions beneath each of the lens units; and a control circuitry that has a two-dimensional mode, configured to render content for the display, wherein in the two-dimensional mode, the rendered content includes image segments that are associated with respective viewing zones at a plurality of time periods, and the control circuitry is configured to alternately reassign the image segments to different viewing zones at different time periods.

According to another aspect of the present invention, there is provided an electronic device, comprising: a display that includes an array of pixels for a plurality of lenticular lens units to cover, wherein the display has a plurality of independently controllable viewing zones; and a control circuitry that has a monoscopic mode and a stereoscopic mode, configured to render content for the display: when in the stereoscopic mode, the rendered content includes three-dimensional images that are each associated with a respective viewing zone and the control circuitry is configured to simultaneously present said three-dimensional images on the respective viewing zones; and when in the monoscopic mode, the rendered content includes image segments and the control circuitry is configured to alternately switch the image segments between the viewing zones at an indicated refresh rate.

According to another aspect of the present invention, there is provided an electronic device, comprising: a display that includes an array of pixels for a plurality of lenticular lens units to cover, wherein the display has a plurality of independently controllable viewing zones based on their relative positions beneath each of the lens units; and a control circuitry that has a two-dimensional mode, configured to render content for the display, wherein, in the two-dimensional mode, the rendered content includes a first set of image segments and a second set of image segments based on their relative positions beneath each of the lens units; and the display sequentially present the first set of image segments and the second set of image segments in turn repeatedly.

According to another aspect of the present invention, there is provided an electronic device, comprising: a display that includes an array of pixels for a plurality of lenticular lens units to cover, wherein the display has a plurality of independently controllable viewing zones based on their relative positions beneath each of the lens units; and a control circuitry that has a two-dimensional mode, configured to render content for the display, wherein, in the two-dimensional mode, the rendered content includes a first set of image segments and a second set of image segments based on their relative positions beneath each of the lens units; and the display presents the first set of image segments and the second set of image segments on each of the viewing zones in turn repeatedly.

According to another aspect of the present invention, there is provided an electronic device, comprising: a display that includes an array of pixels for a plurality of lenticular lens units to cover, wherein the display has a plurality of independently controllable viewing zones based on their relative positions beneath each of the lens units; and a control circuitry that has a two-dimensional mode, configured to render content for the display, wherein, in the two-dimensional mode, the rendered content includes a first set of image segments, a second set of image segments, and a third set of image segments based on their relative positions beneath each of the lens units; a plurality of frames to be presented, each having a different combinations for the sets of image segments to be presented on the different viewing zones; and the display presents one of the combinations for the sets of image segments to be presented in a higher number of frames compared to other combinations.

According to another aspect of the present invention, there is provided an electronic device, comprising: a display 3 comprising an array of pixels configured to be covered by a plurality of lenticular lens units 11, wherein the display 3 defines a plurality of controllable viewing zones (e.g., v1, v2, v3) based on their respective positions beneath the lenticular lens units 11; and control circuitry configured with a two-dimensional mode for rendering content on the display 3, wherein, in the two-dimensional mode, the rendered content includes image segments (e.g., e1, e2, e3) associated with respective viewing zones at different time periods. Furthermore, the rendered content is generated by an image segmentation process configured to partition a two-dimensional image into a plurality of image segments; the array of pixels is arranged in rows and columns, oriented along a row direction and a column direction, and the image segments have boundaries (e.g., B1, B2) that are angled relative to the row direction and the column direction.

According to another aspect of the present invention, there is provided an electronic device, comprising: a display 3 including an array of pixels configured to be covered by a plurality of lenticular lens units 11, wherein the display 3 defines a plurality of controllable viewing zones (e.g., v1, v2, v3); and control circuitry having a monoscopic mode and a stereoscopic mode, configured to render content for the display 3; wherein, in the stereoscopic mode, the rendered content includes three-dimensional images each associated with a respective viewing zone, and the control circuitry is configured to simultaneously present the three-dimensional images on the respective viewing zones; and wherein, in the monoscopic mode, the rendered content includes image segments (e.g., e1, e2, e3), and the control circuitry is configured to alternately switch the image segments between the viewing zones at an indicated refresh rate (e.g., 24-Hz, 60-Hz, 120-Hz or the adaptive refresh rate).

According to another aspect of the present invention, there is provided a method for operating an electronic display device comprising a display 3 having an array of pixels overlaid by a plurality of lenticular lens units 11, the method comprising the steps of: defining a plurality of controllable viewing zones (e.g., v1, v2, v3) based on relative positions of the pixels beneath the lenticular lens units 11; rendering content for the display using control circuitry that supports a monoscopic mode and a stereoscopic mode; rendering, in the stereoscopic mode, three-dimensional images each associated with a respective viewing zone, and simultaneously presenting the three-dimensional images on the respective viewing zones; and rendering, in the monoscopic mode, image segments (e.g., e1, e2, e3) and alternately switching the image segments between the viewing zones at an indicated refresh rate (e.g., 24-Hz, 60-Hz, 120-Hz or the adaptive refresh rate).

The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art. All changes and modifications that fall within the metes and bounds of the claims are intended to be embraced by the appended claims.

The invention claimed is:

1. An electronic device, which offers improved image uniformity and stable two-dimensional viewing in lenticular-based displays while preserving support for stereoscopic content, comprising:

a display comprising an array of pixels for a plurality of lenticular lens units to cover, wherein the display defines a plurality of controllable viewing zones based on their respective positions beneath the lenticular lens units; and control circuitry configured with a two-dimensional mode for rendering content on the display, wherein in the two-dimensional mode, the rendered content includes an image segmentation process, configured to partition a two-dimensional image into a plurality of image segments wherein said image segments are associated with respective viewing zones at a plurality of time periods, and the control circuitry is further configured to alternately reassign the image segments to different viewing zones at different time periods.

2. The electronic device according to claim 1, wherein said array of pixels is arranged in rows and columns, oriented along a row direction and a column direction, and said image segments have boundaries that are slanted at an angle relative to the row direction and the column direction.

3. An electronic device, which offers improved image uniformity and stable monoscopic viewing in lenticular-based displays while preserving support for stereoscopic content, comprising:

a display that includes an array of pixels for a plurality of lenticular lens units to cover, wherein the display has a plurality of controllable viewing zones; and a control circuitry that has a monoscopic mode and a stereoscopic mode, configured to render content for the display:

when in the stereoscopic mode, the rendered content includes three-dimensional images that are each associated with a respective viewing zone and the control circuitry is configured to simultaneously present said three-dimensional images on the respective viewing zones; and when in the monoscopic mode, the rendered content includes image segments and the control circuitry is configured to associate the image segments with respective viewing zones and alternately switch the image segments between the viewing zones at an indicated refresh rate.

4. The electronic device according to claim 3, wherein the shape of the viewing zones in the stereoscopic mode is different from that in the monoscopic mode.

5. The electronic device according to claim 3, wherein said rendered content includes an image segmentation process, configured to partition a two-dimensional image into a plurality of image segments.

6. A method for operating an electronic display device comprising a display having an array of pixels overlaid by a plurality of lenticular lens units, the method comprising:

defining a plurality of controllable viewing zones based on the relative positions of the pixels beneath the lenticular lens units;

rendering content for the display using control circuitry that supports a monoscopic mode and a stereoscopic mode;

in the stereoscopic mode, rendering three-dimensional images, each associated with a respective viewing zone, and simultaneously presenting said three-dimensional images on the respective viewing zones; and in the monoscopic mode, partitioning a two-dimensional image into a plurality of image segments;

rendering the plurality of image segments and associating the plurality of image segments with respective viewing zones; and alternately reassigning the plurality of image segments to different viewing zones at an indicated refresh rate.

* * * * *